United States Patent
Falkenstein et al.

(10) Patent No.: US 10,428,859 B2
(45) Date of Patent: Oct. 1, 2019

(54) COMBINATION RECESS FOR DRIVEN FASTENER

(71) Applicant: THE HILLMAN GROUP, INC., Cincinnati, OH (US)

(72) Inventors: Michael K. Falkenstein, Oakville (CA); Farhad Lajewardi, Toronto (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 99 days.

(21) Appl. No.: 15/614,267

(22) Filed: Jun. 5, 2017

(65) Prior Publication Data

US 2018/0347612 A1 Dec. 6, 2018

(51) Int. Cl.
*F16B 23/00* (2006.01)
*B25B 15/00* (2006.01)

(52) U.S. Cl.
CPC ........ *F16B 23/0092* (2013.01); *B25B 15/005* (2013.01); *B25B 15/007* (2013.01); *F16B 23/003* (2013.01); *F16B 23/0015* (2013.01); *F16B 23/0023* (2013.01); *F16B 23/0038* (2013.01)

(58) Field of Classification Search
CPC .............. F16B 23/003; F16B 23/0007; F16B 23/0023; F16B 23/0038; F16B 23/0092; F16B 23/0015
USPC .......................................... 411/402–405, 410
See application file for complete search history.

(56) References Cited

U.S. PATENT DOCUMENTS

| 2,140,449 | A | * | 12/1938 | Brown | F16B 23/0007 411/410 |
| 2,359,898 | A | * | 10/1944 | Clark | F16B 23/0092 411/404 |
| 5,020,954 | A | | 6/1991 | Dreger | |
| 5,358,368 | A | * | 10/1994 | Conlan | F16B 23/0092 411/403 |
| 5,674,037 | A | * | 10/1997 | Lu | F16B 23/0092 411/404 |
| 6,302,632 | B1 | * | 10/2001 | Lin | B25B 15/005 411/404 |
| 6,890,139 | B2 | | 5/2005 | Hughes | |
| 7,225,710 | B2 | | 6/2007 | Pacheco, Jr. | |
| D647,392 | S | * | 10/2011 | Zacharevitz | D8/387 |
| 2003/0059276 | A1 | | 3/2003 | Chen | |

(Continued)

FOREIGN PATENT DOCUMENTS

| CN | 203404206 | 1/2014 |
| DE | 102005052694 | 5/2007 |

(Continued)

OTHER PUBLICATIONS

PCT, International Search Report and Written Opinion, International Application No. PCT/US2018/24244; dated Jun. 15, 2018, 13 pages.

*Primary Examiner* — Flemming Saether
(74) *Attorney, Agent, or Firm* — Thompson Hine LLP

(57) ABSTRACT

A threaded fastener includes a head end, a shank and an entry end, the head end located at one end of the shank and the entry end located at an opposite end of the shank. The head end includes an end face with a drive recess configured for being driven by multiple drive bit shapes, including a star or six lobe drive, a Phillips drive, a square drive and a flat blade drive.

13 Claims, 34 Drawing Sheets

(56) References Cited

U.S. PATENT DOCUMENTS

2003/0190216 A1* 10/2003 Livingston .......... F16B 23/0023
  411/403
2009/0257844 A1* 10/2009 Chou .................. F16B 23/0023
  411/410

FOREIGN PATENT DOCUMENTS

GB          2350657       12/2000
GB          2431212        4/2007

* cited by examiner

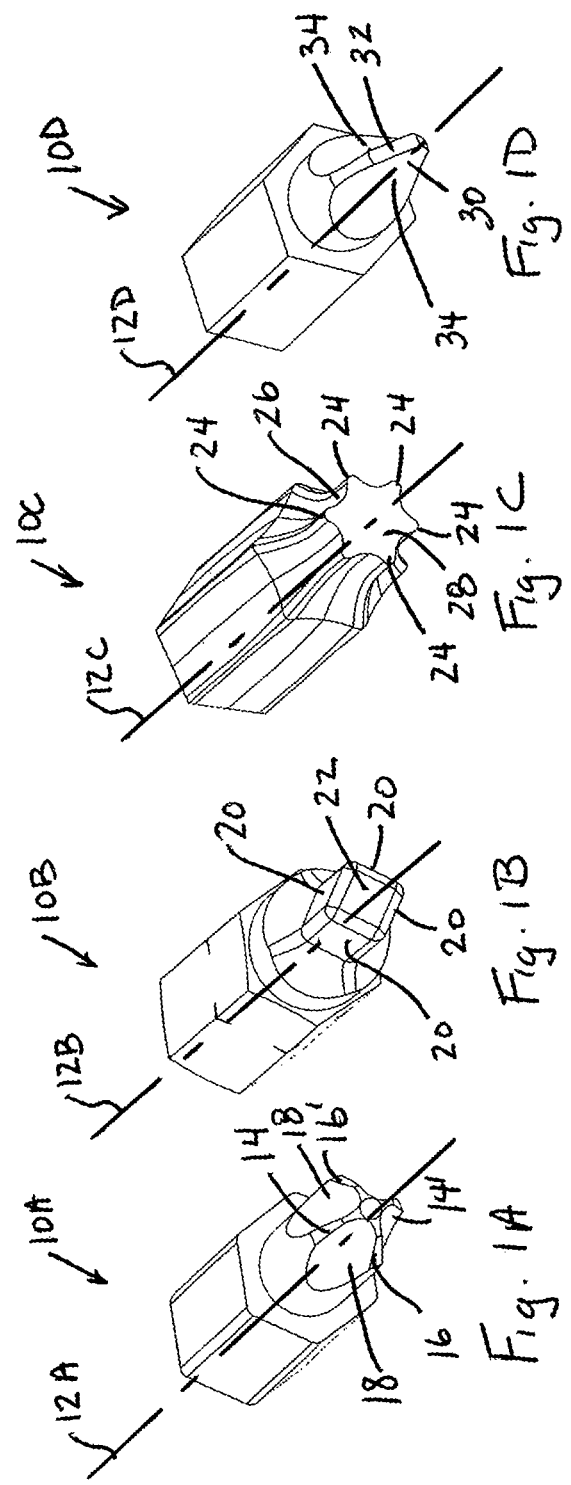

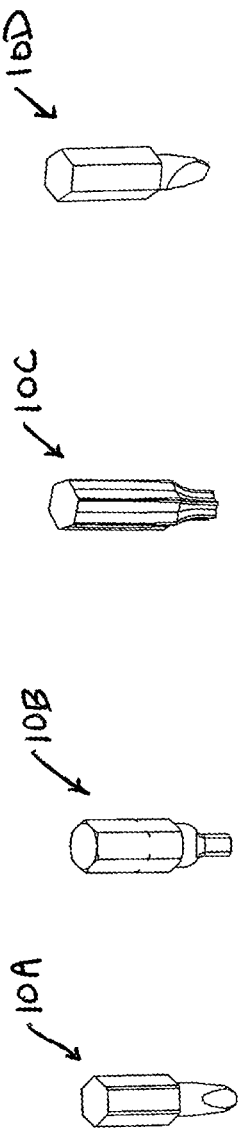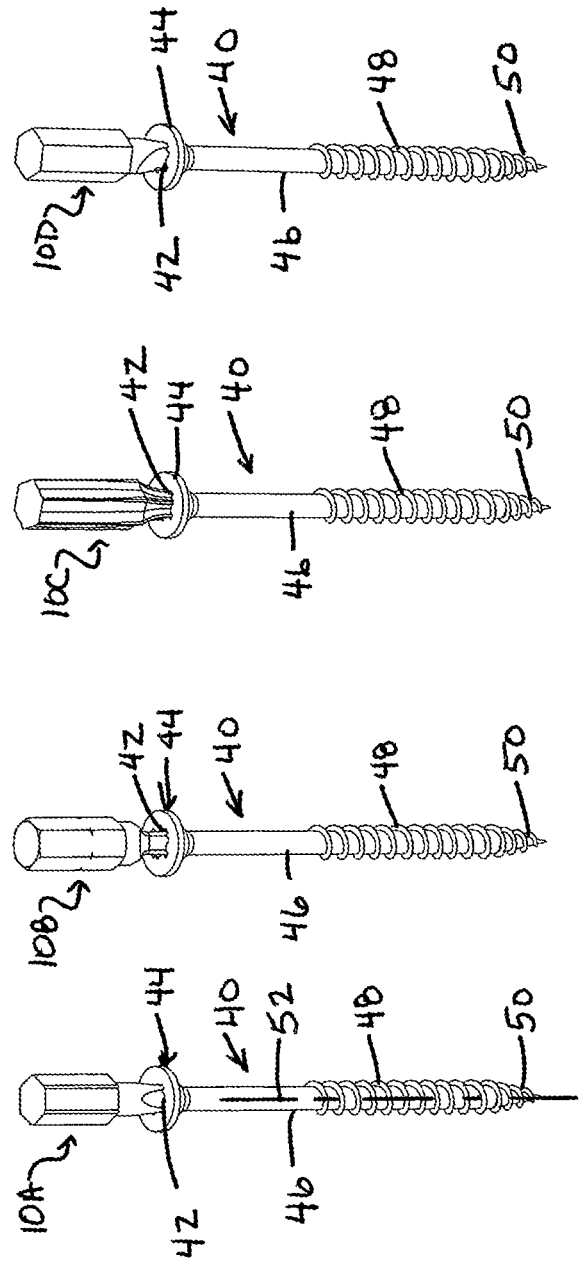

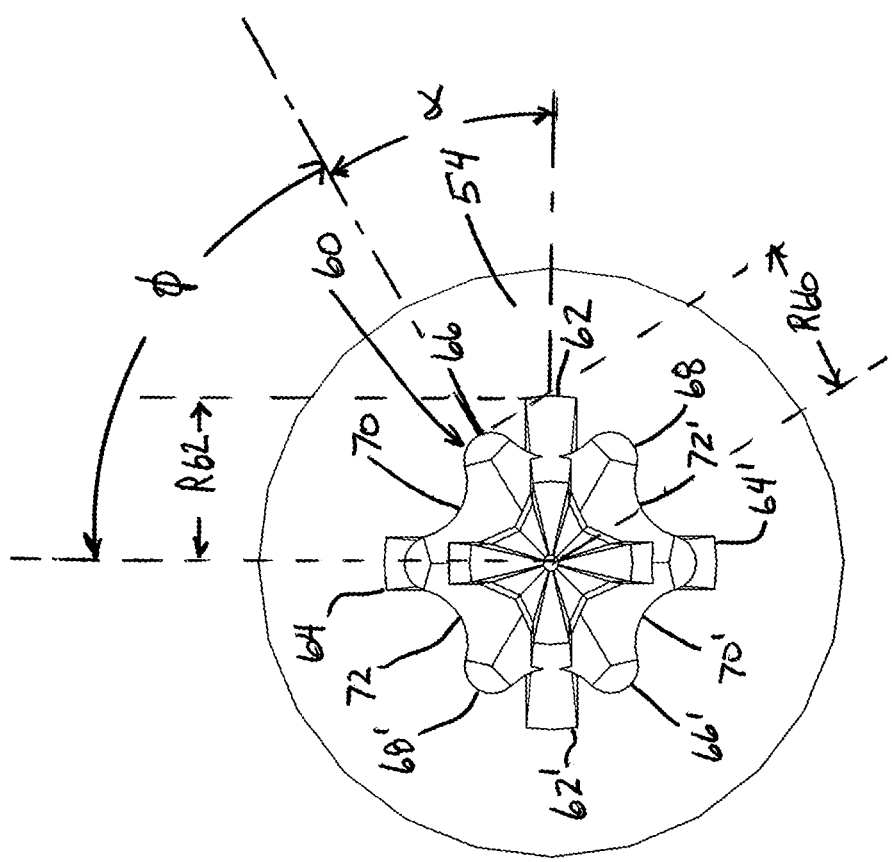

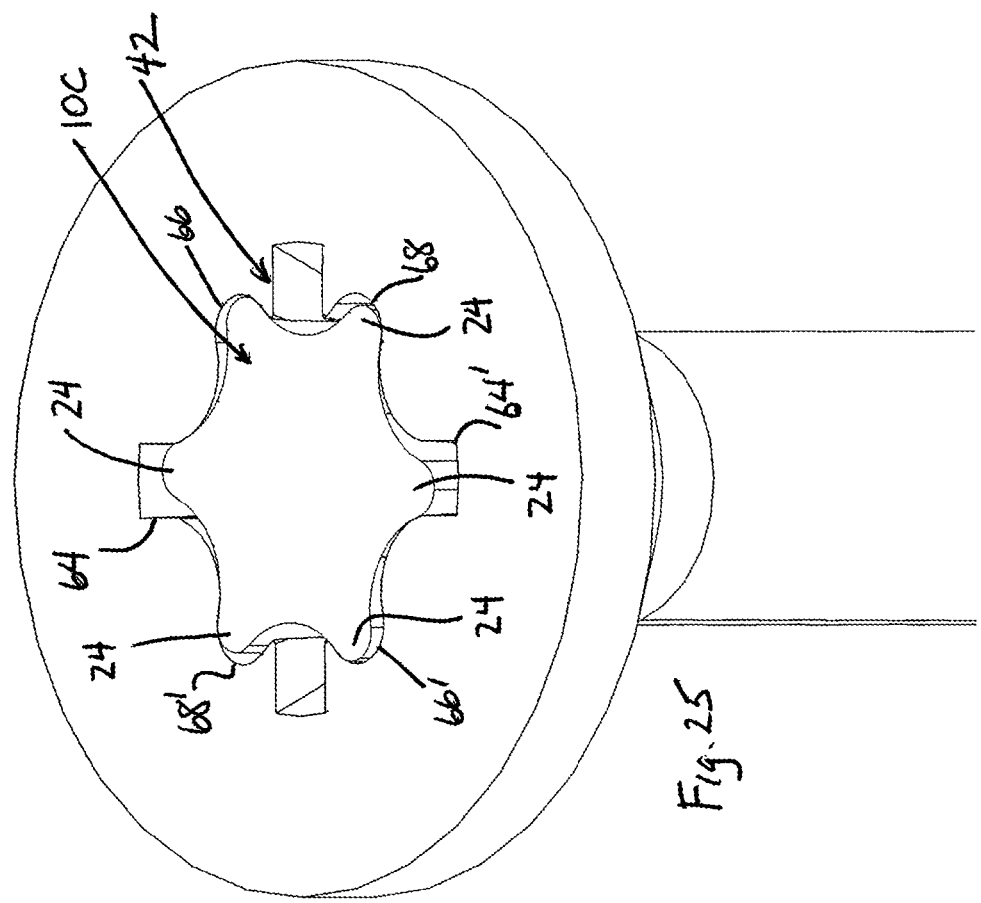

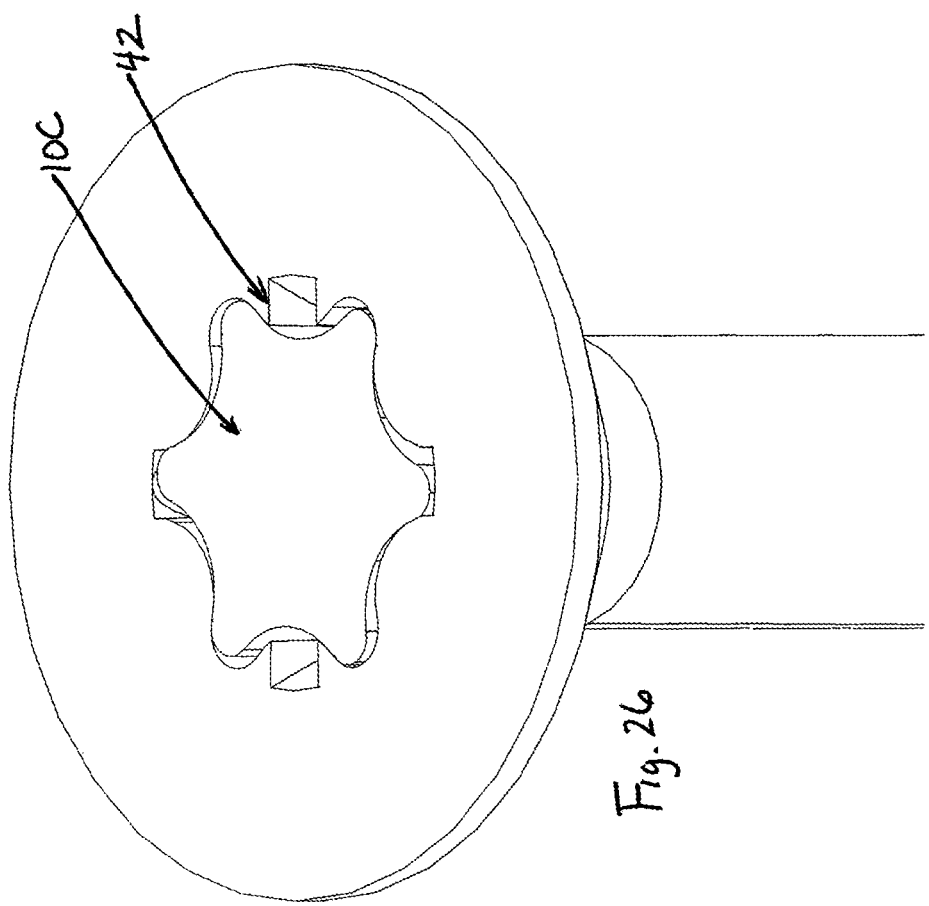

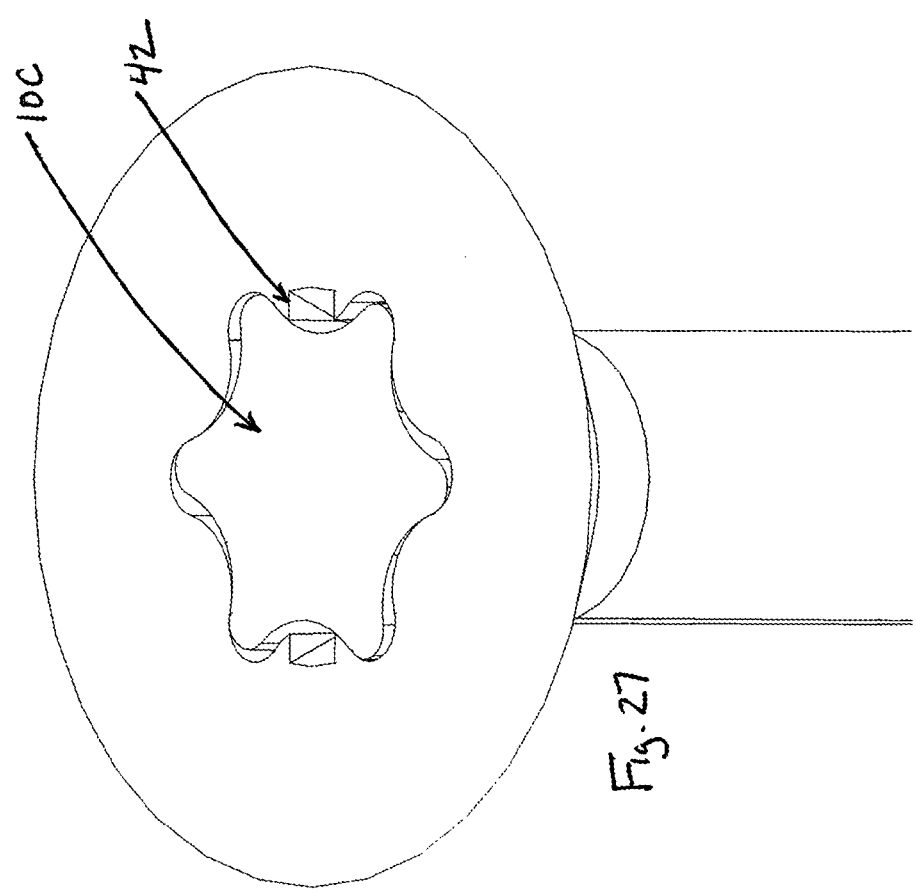

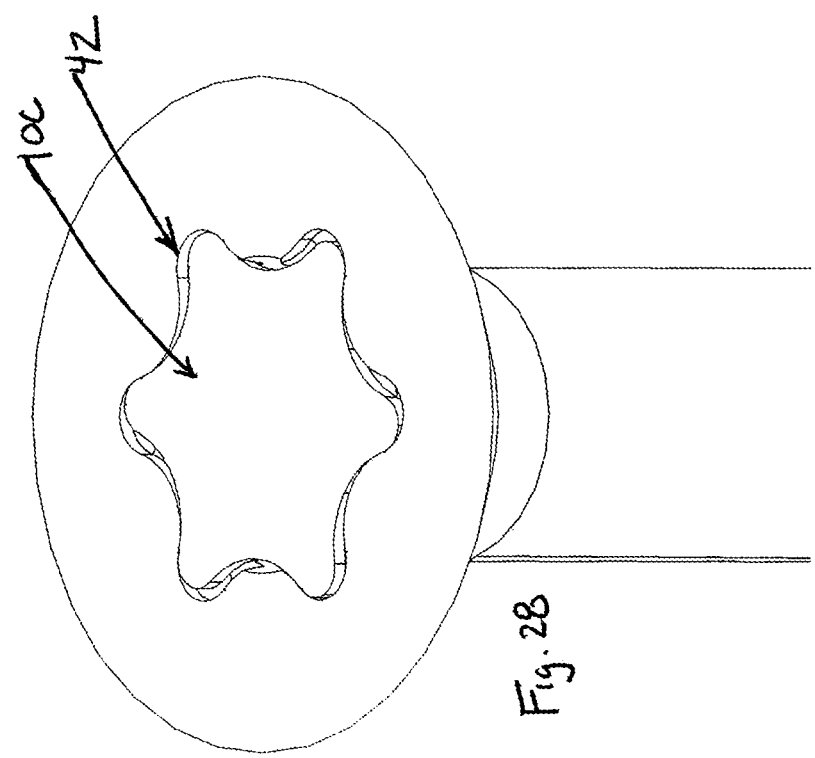

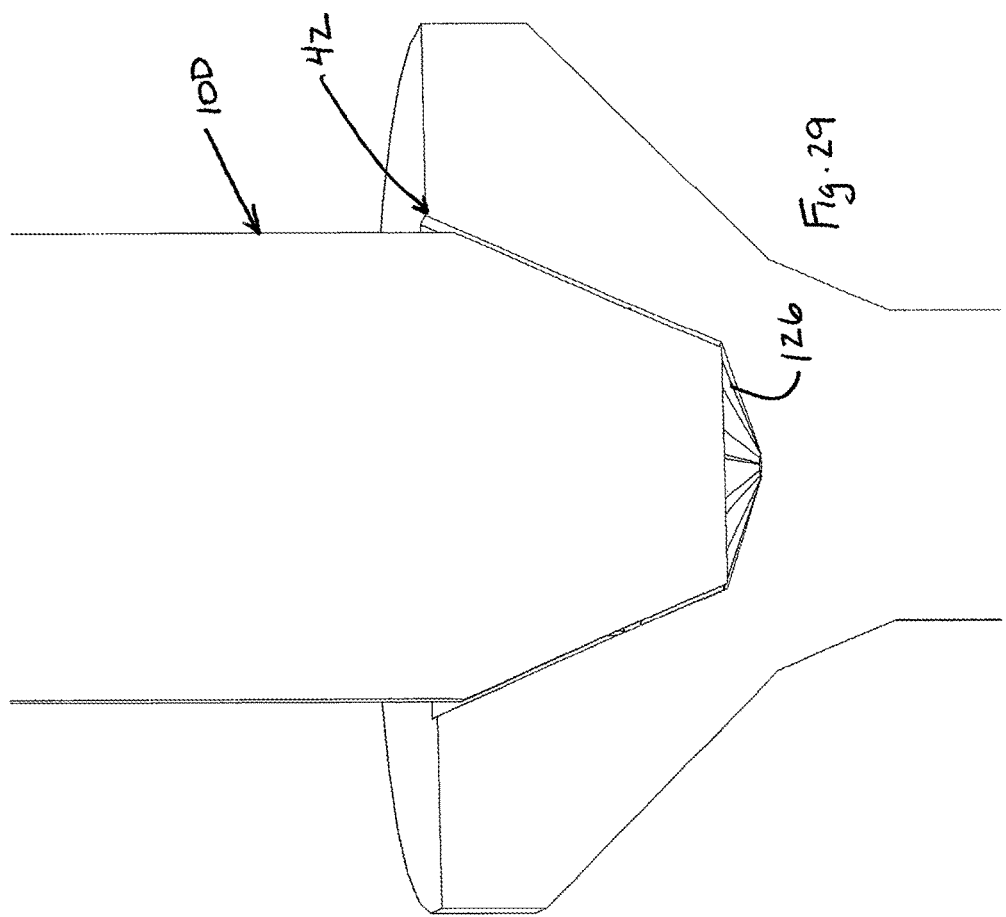

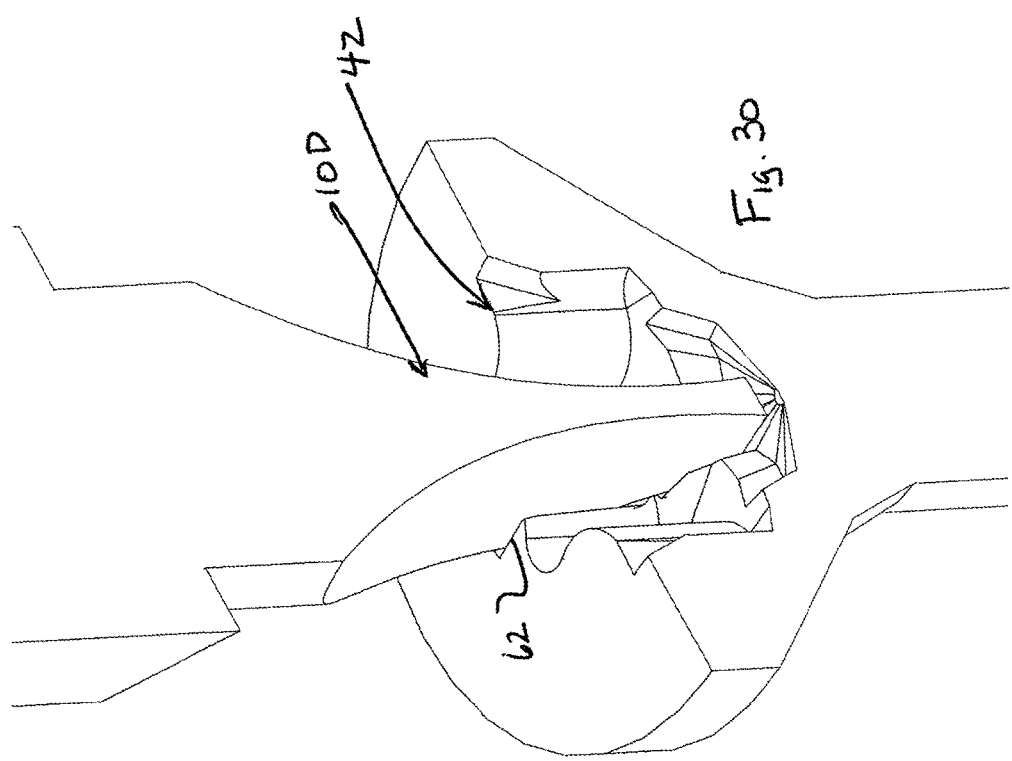

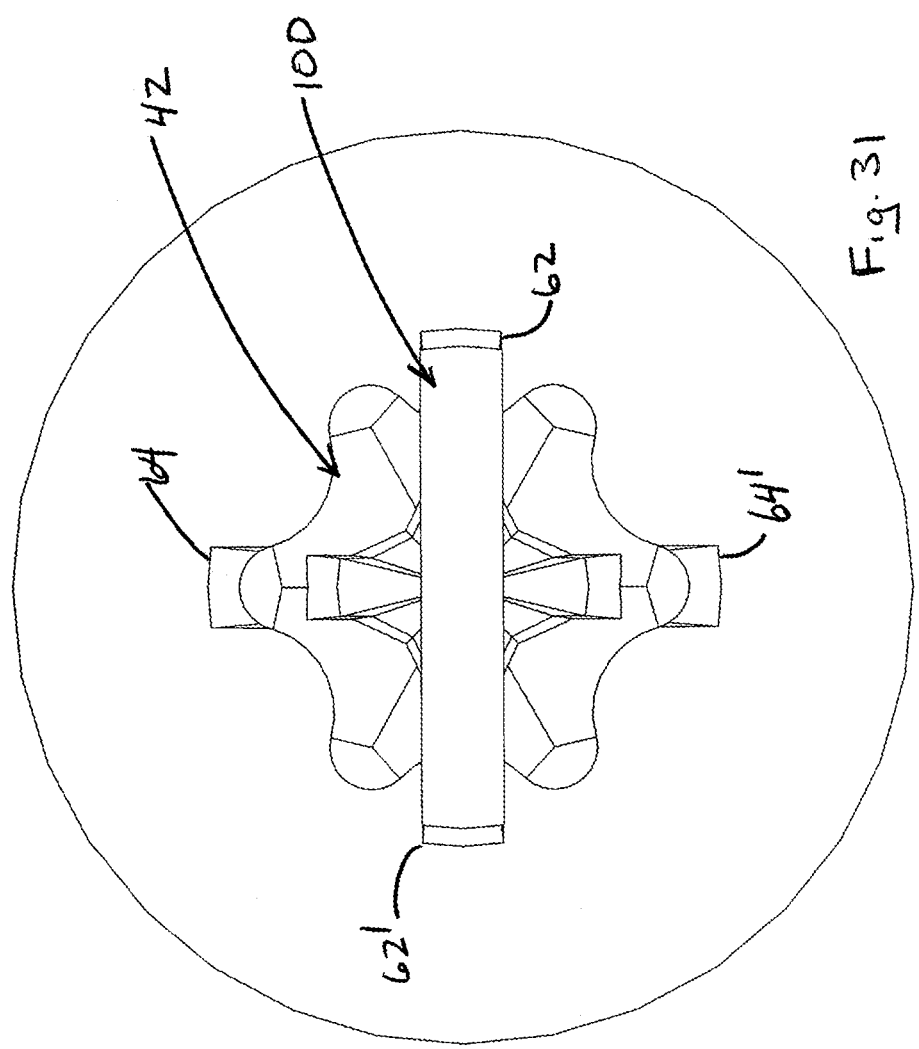

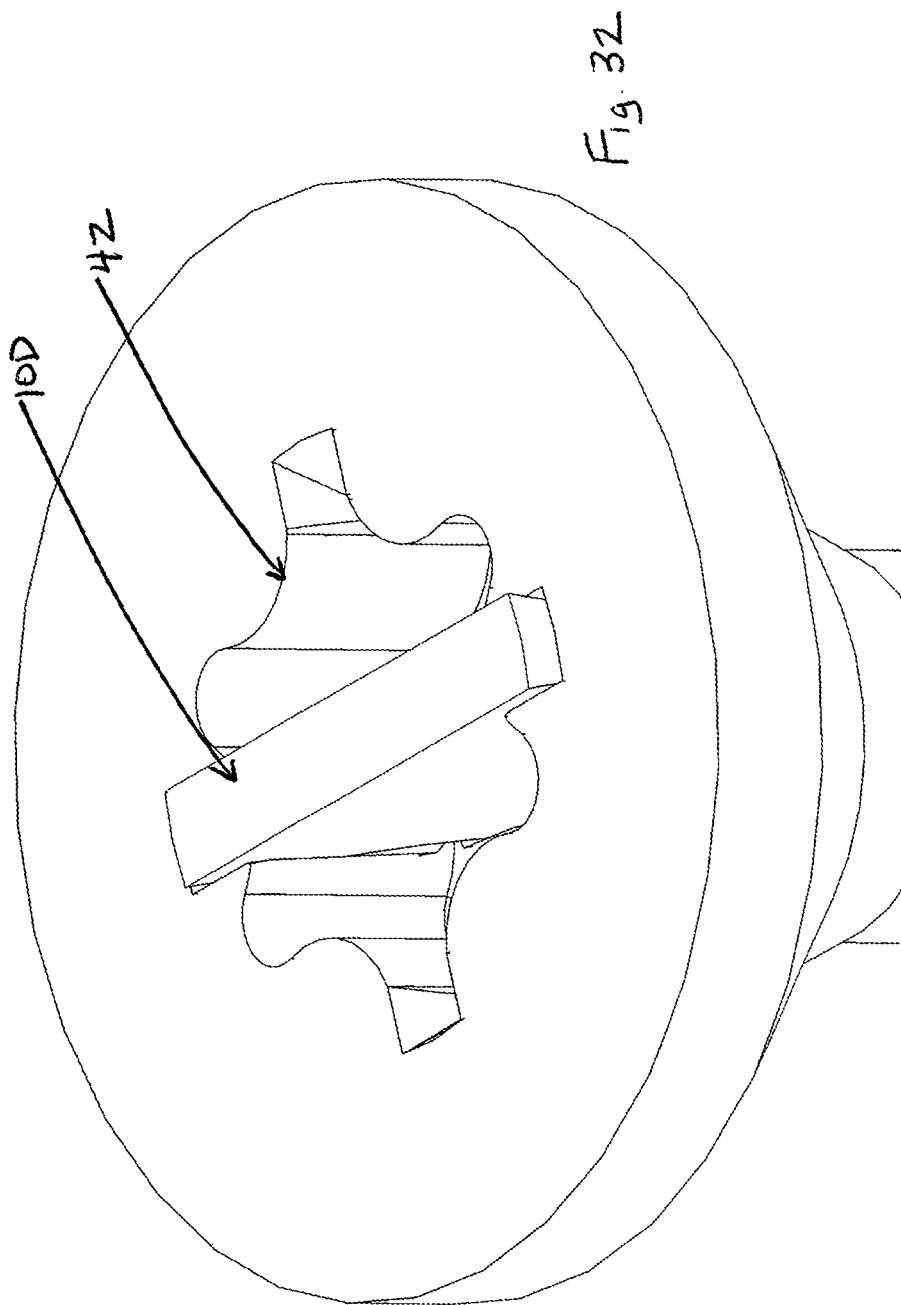

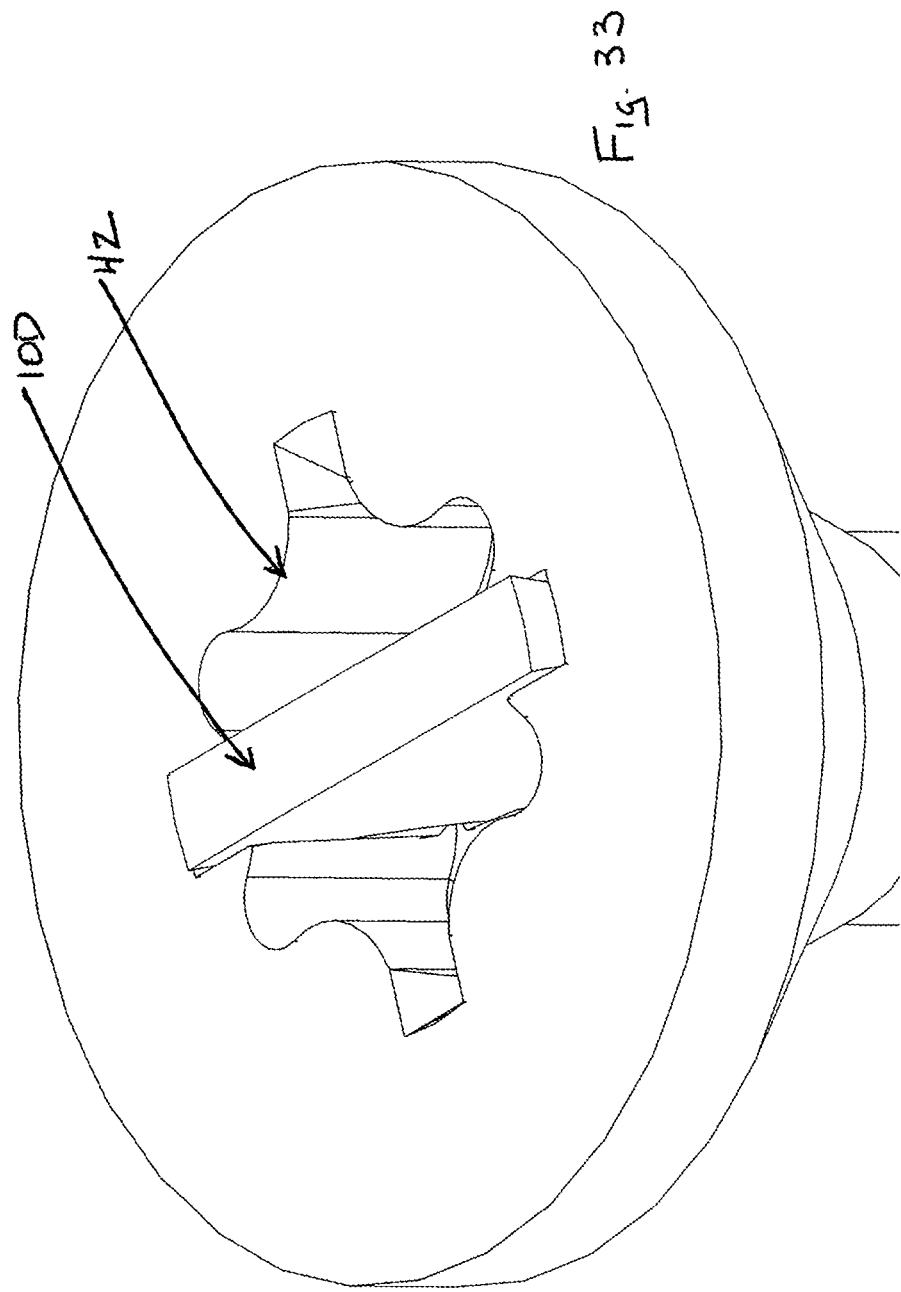

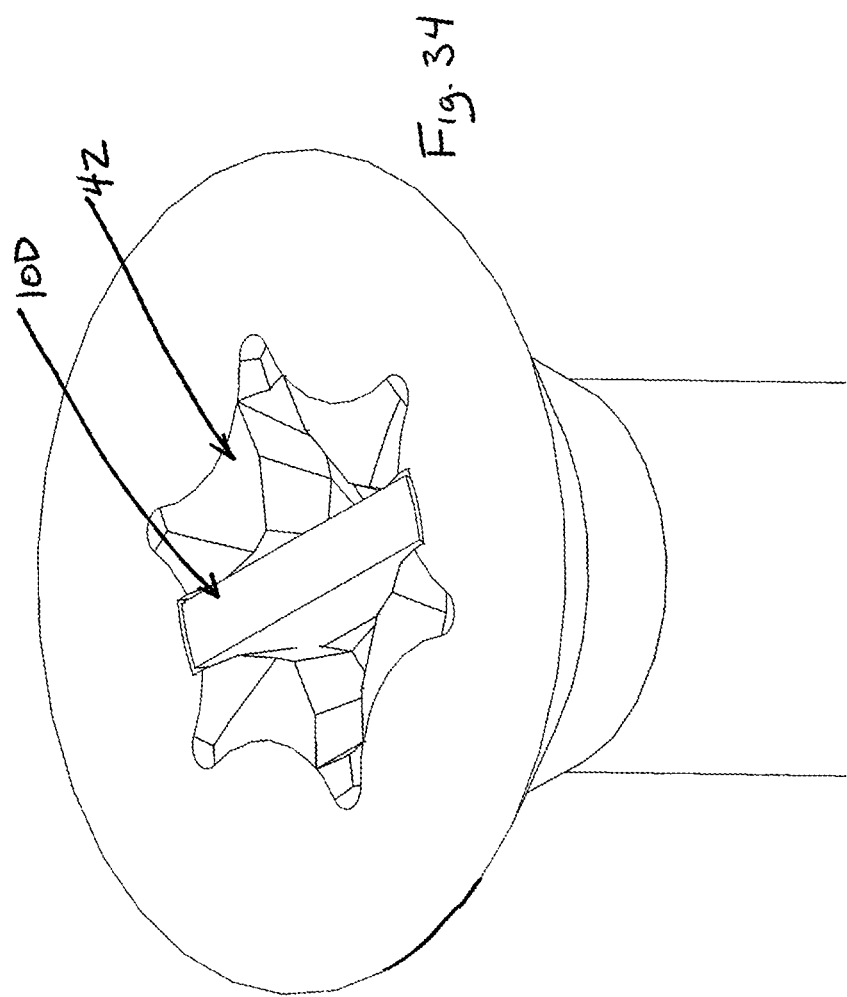

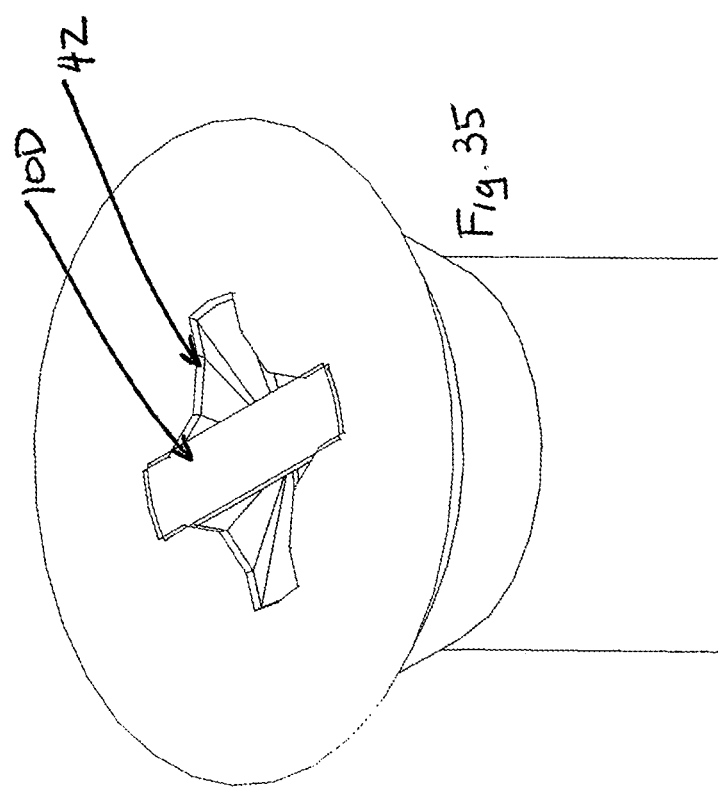

US 10,428,859 B2

COMBINATION RECESS FOR DRIVEN FASTENER

TECHNICAL FIELD

This application relates generally to threaded fasteners, and more particularly, to a combination drive recess for such a fastener.

BACKGROUND

A typical screw configuration includes an elongated shank that extends between a driving head of the screw and a pointed end of the screw. At least part of the shank is helically threaded. The driving head includes a drive recess into which a drive bit may be inserted in order to rotate the screw for movement into a structure. Typical drive recesses are configured for mating with a specific type of drive bit configuration. In some cases, recesses are configured for mating with two or more drive bit types. For example, U.S. Pat. No. 5,358,369 discloses a combination drive recess capable of receiving a square socket (Robertson) type driver, a cross-recess (Phillips) type screw driver and a flat blade driver.

Improvements in ease of use are regularly sought for the construction industry. It would be desirable to provide a fastener with a drive recess capable of being driven by each of a Star drive, a Phillips drive, a square drive and a slot drive.

SUMMARY

In one aspect, a threaded fastener includes a head end, a shank and an entry end, the head end located at one end of the shank and the entry end located at an opposite end of the shank. The head end includes an end face with a drive recess configured for being driven by multiple drive bit shapes, including a star or six lobe drive, a Phillips drive, a square drive and a flat blade drive.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1A-1D show Phillips, square, star and slot drive bits;

FIGS. 2A-2D show the Phillips, square, star and slot drive bits;

FIGS. 3A-3D show the Phillips, square, star and slot drive bits engaged in a fastener drive recess;

FIG. 4 shows an end view of the head end of the fastener with drive recess;

FIGS. 22-28 show various cross-sections of the star drive bit engaged within the drive recess; and FIGS. 29-35 show various cross-sections of the flat blade drive bit engaged within the drive recess.

DETAILED DESCRIPTION

Figure 5:
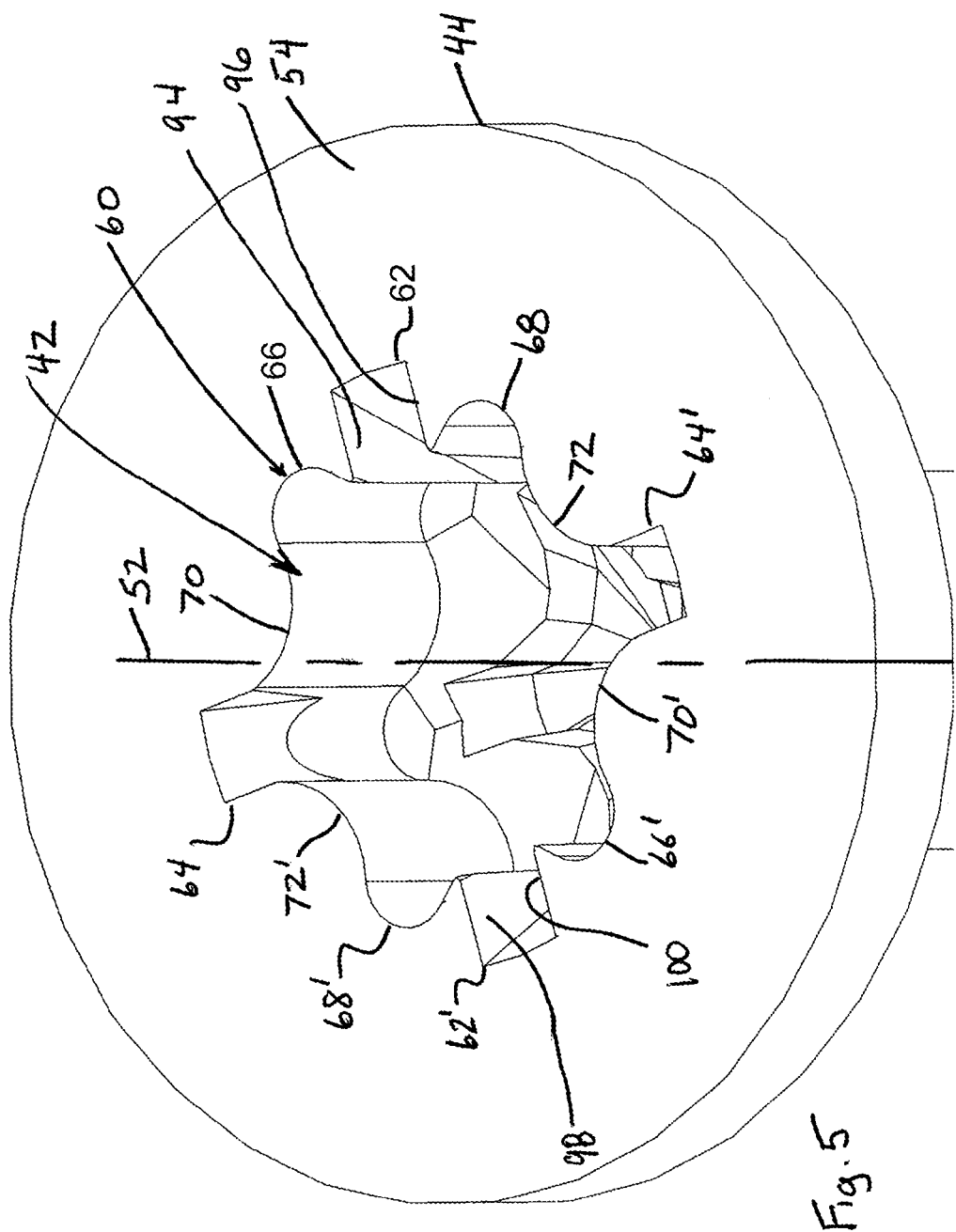
FIG. 5 shows a perspective view of the head end.

Referring to FIGS. 1A-1D and 2A-2D, a Phillips drive bit 10A, a square drive bit 10B, a star drive bit 10C and a slot drive bit 10D are shown, with respective drive axes 12A-12D. Generally, a Phillips drive includes two sets of diametrically opposed drive wings 14, 14' and 16, 16', with the sets offset from each other by ninety degrees, with curved regions 18 interconnecting the wings. The curvature of each region 18 is both concave relative to a drive axis 12A of the drive bit and fades when moving away from the tip of the bit. A square drive includes four substantially planar drive walls 20 and an substantially planar end wall 22 to form a rectangular box-shaped tip, where some radius of curvature may be provided at edges where drive walls 20 meet each other and at edges where drive walls 20 meet end wall 22. A star or six lobe drive includes six rounded drive lobes 24 equally spaced about the drive axis 12C with concave curvature regions 26 interconnecting the drive lobes 24 and with a substantially planar end wall 28. A slot drive includes a flat blade configuration 30 and may have tapered side edges 32 angling toward the tip, with opposed sides 34 of the blade having little or no curvature at the tip but gaining in concave curvature when moving away from the tip.

As seen in FIGS. 3A-3D, each of the drive bits 10A-10D is engageable in a drive recess 42 of a fastener 40, where the drive recess 42 is shaped, sized and configured to facilitate driving by any one of the bit configurations. Here, the fastener 40 is in the form of a screw with a head end 44, a shank 46 with one or more threads 48 and a tapered entry end 50, all along a central elongated axis 52 that substantially aligns with the drive bit axis during engagement and driving. However, it is recognized that other threaded fastener types are possible, such as bolts in which the entry end is not tapered or pointed. The exact configuration, size and number of threads can also vary widely, as can the overall length, shape and size of the enlarged head 44.

Referring to FIGS. 4-7, the drive recess 42 is configured as a combination drive recess to suitably receive and engage with any one of the bit configurations 10A-10D for suitable driving. In this regard, the drive recess 42 is formed in end face 54 of the head 44 and has an end profile 60 about the central axis 52. End face 54 may be substantially planar. The recess end profile 60 includes diametrically opposed and outwardly extending rectangular segments 62, 62', diametrically opposed and outwardly extending rectangular segments 64, 64', diametrically opposed and outwardly extending curved segments 66, 66', diametrically opposed and outwardly extending curved segments 68, 68', diametrically opposed and inwardly extending curved segments 70, 70' and diametrically opposed and inwardly extending curved segments 72, 72'. Opposed rectangular segments 62, 62' are circumferentially offset from opposed rectangular segments 64, 64' by ninety degrees. Opposed curved segments 66, 66' are circumferentially offset from opposed curved segments 68, 68' by sixty degrees.

As shown, curved segment 66 is located adjacent one side of rectangular segment 62, and curved segment 68 is located adjacent an opposite side of rectangular segment 62. Curved segment 66' is located adjacent one side of rectangular segment 62', and curved segment 68' is located adjacent an opposite side of rectangular segment 62'. Curved segment 70 is located adjacent one side of rectangular segment 64, and curved segment 72 is located adjacent an opposite side of rectangular segment 64. Curved segment 70' is located adjacent one side of the rectangular segment 64', and curved segment 72' is located adjacent an opposite side of rectangular segment 64'.

A radial distance from the central axis to an outermost part of each outwardly extending rectangular segment (e.g., radial distance R62) may be substantially the same as between the segments 62, 62', 64, and 64' and a radial distance from the central axis to an outermost part of each outwardly extending curved segment (e.g., radial distance R66) may be substantially the same as between segments 66, 66', 68, and 68'. Here, the radial distance from the central axis to outermost part of each outwardly extending rectangular segment (e.g., represented by R62) is greater than the radial distance from the central axis to the outermost part of each outwardly extending curved segment (e.g., represented by R66).

A circumferential angular spacing a between the central part of rectangular segment 62 and the central part of curved segment 66 (or similarly between the central part of rectangular segment 62 curved segment 68, or between the central part of rectangular segment 62' and the central part of curved segment 66' or curved segment 68') is between twenty-eight and thirty-two degrees, such as thirty degrees.

A circumferential spacing φ between the central part of curved segment 66 and the central part of rectangular segment 64 (or similarly between the central part of curved segment 68' and the central part of rectangular segment 64, or between the central part of rectangular segment 64' and the central part of curved segment 66' or curved segment 68) is between 58 and 62 degrees, such as sixty degrees.

Figure 6:
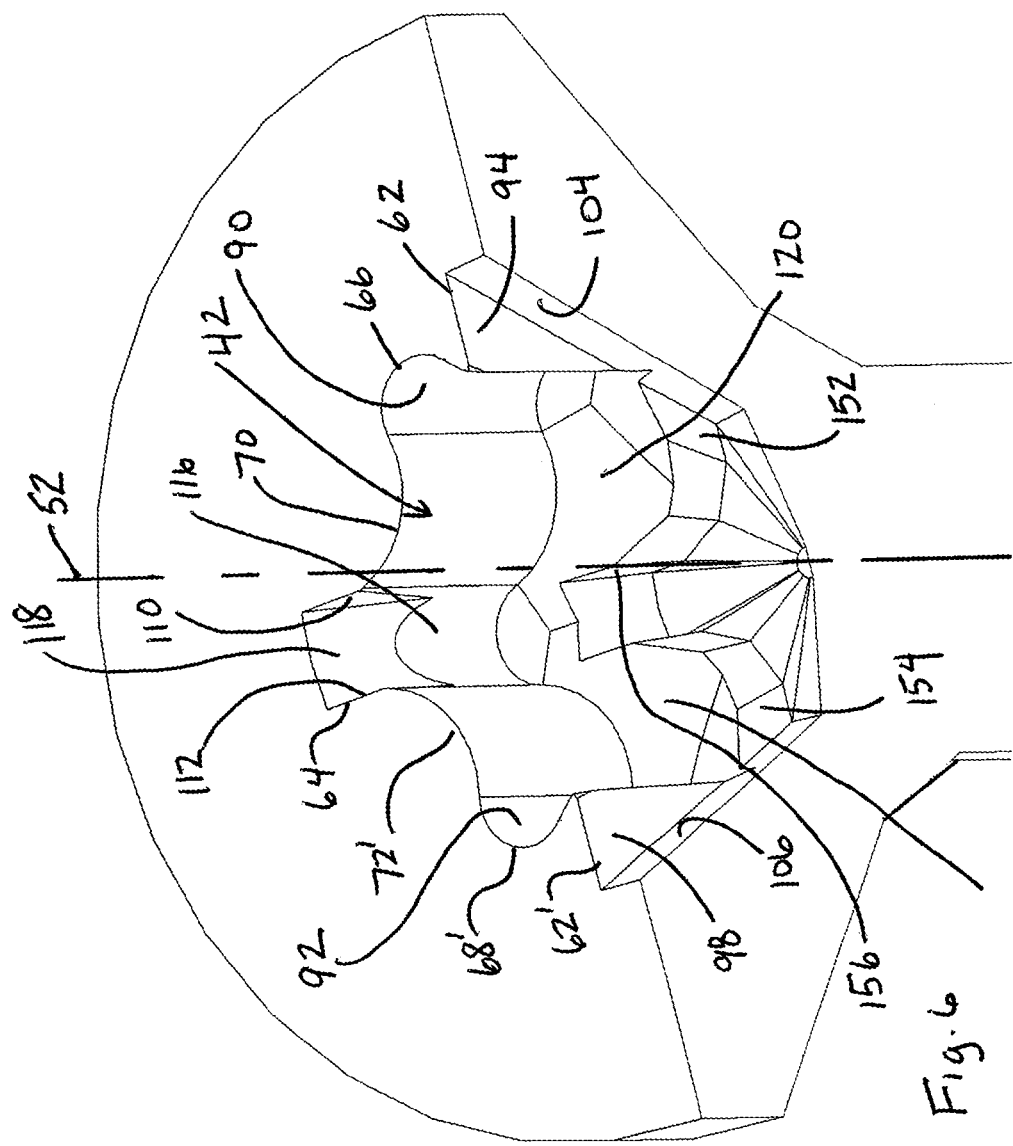
FIGS. 6-8 show cross-section views of the head end and drive recess.
Figure 7:
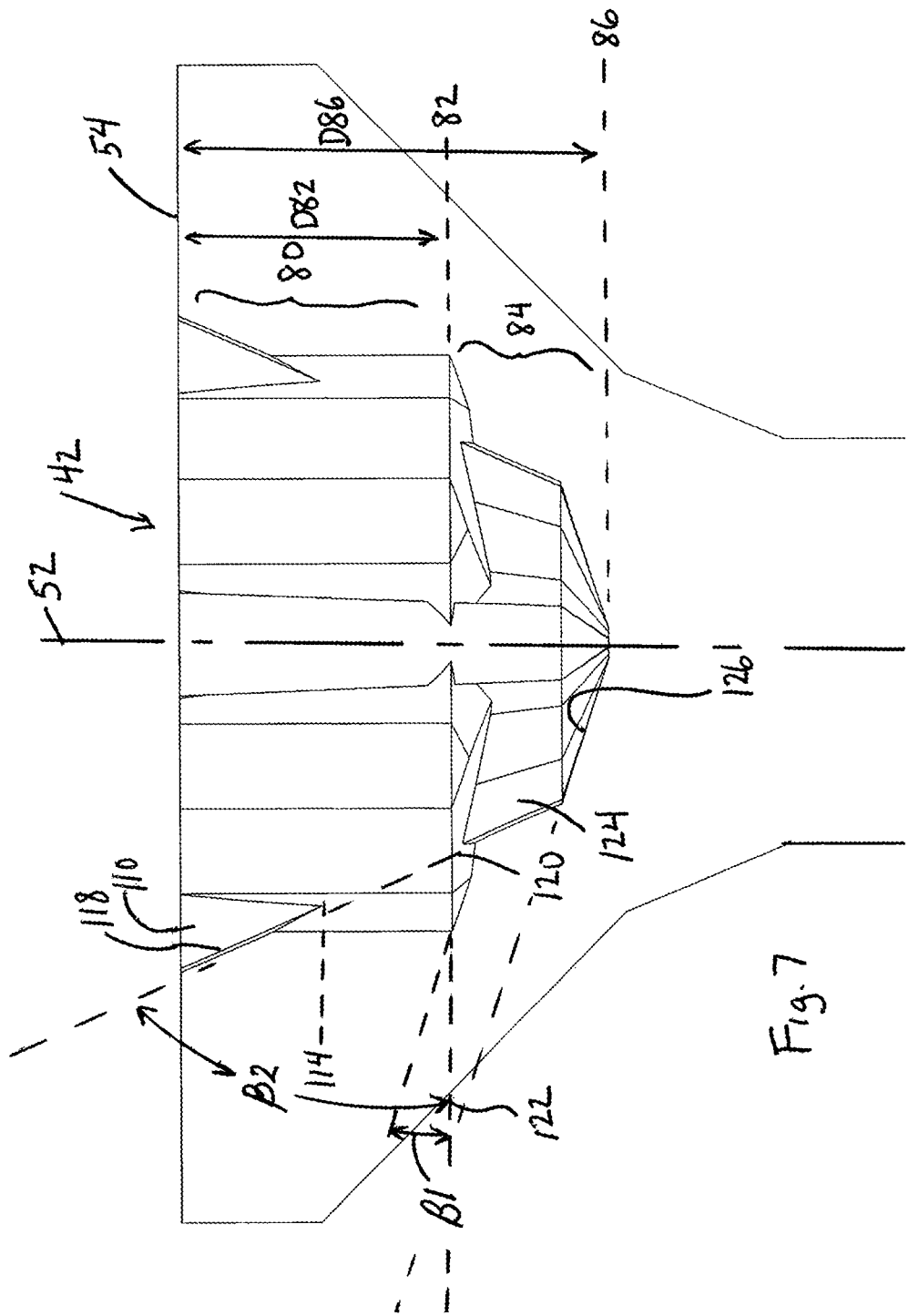
Figure 8:
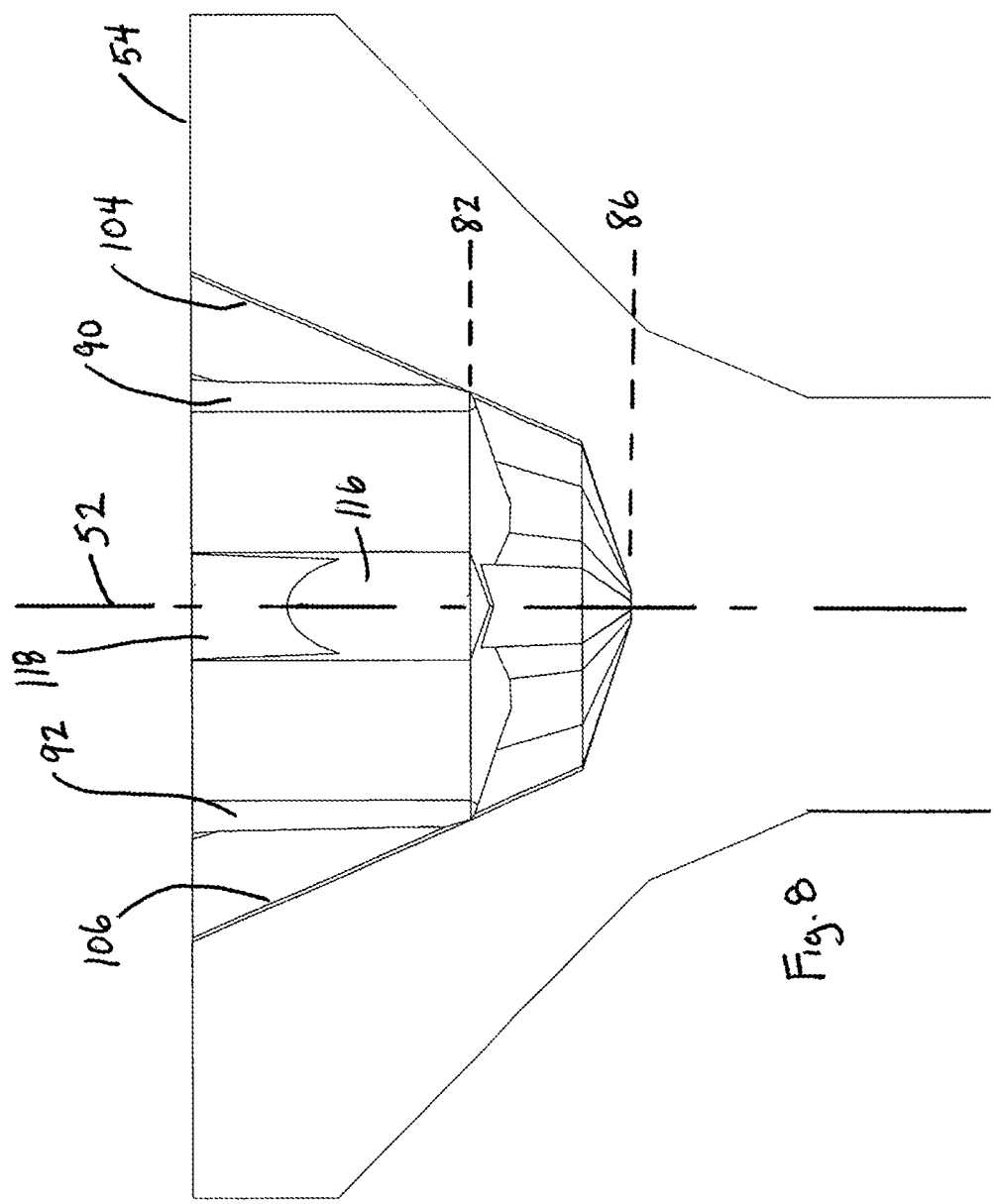
Figure 9:
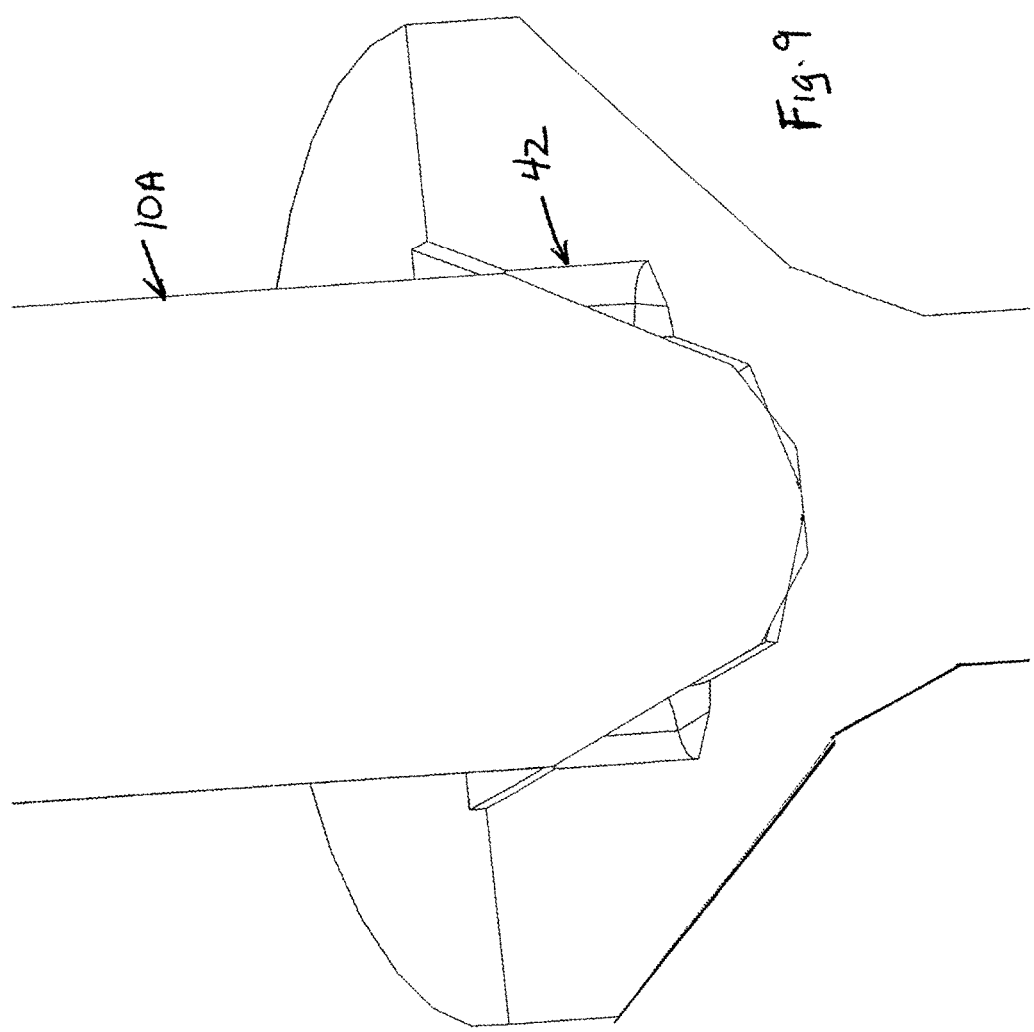
FIGS. 9-15 show various cross-sections of the Phillips drive bit engaged within the drive recess.
Figure 10:
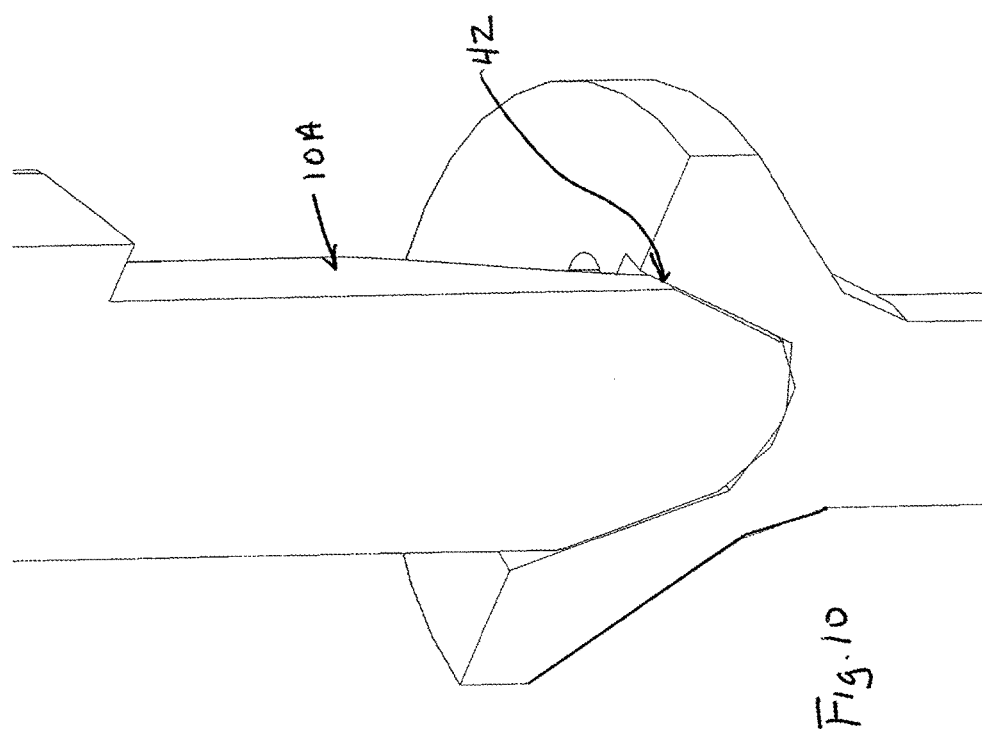
Figure 11:
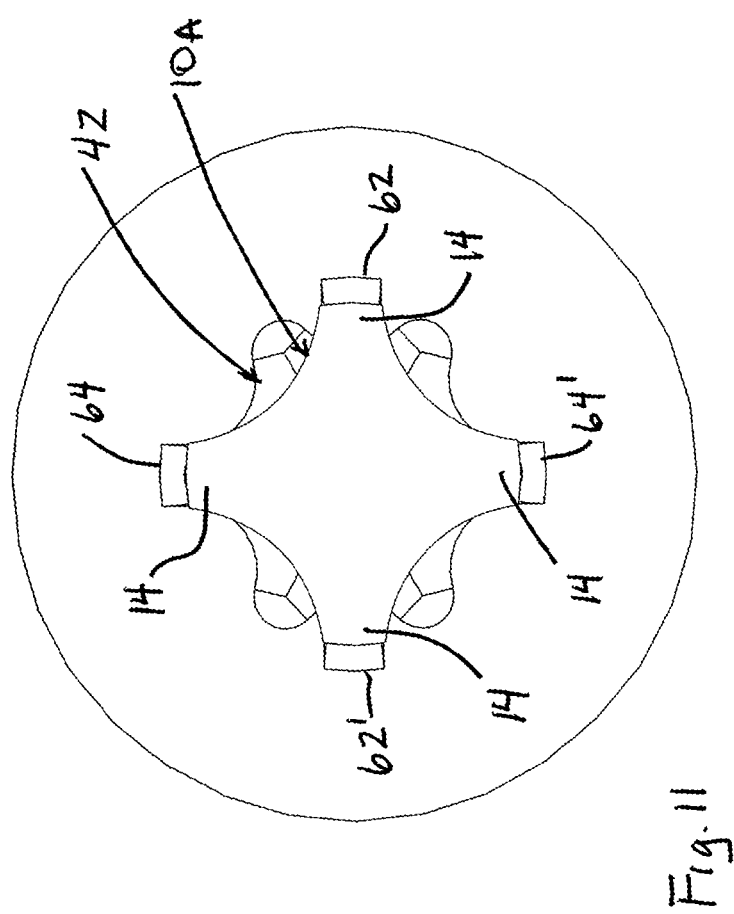
Figure 12:
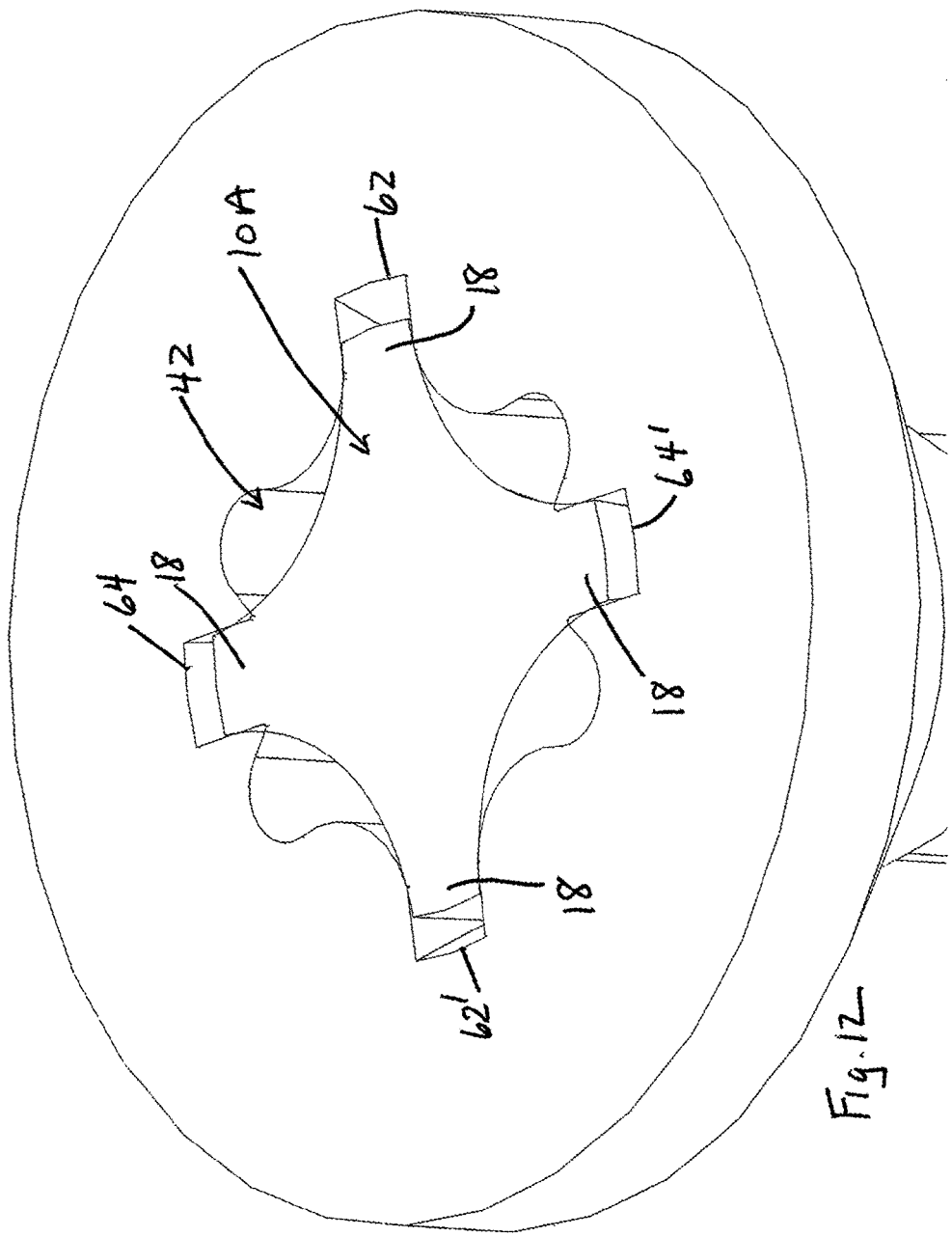
Figure 13:
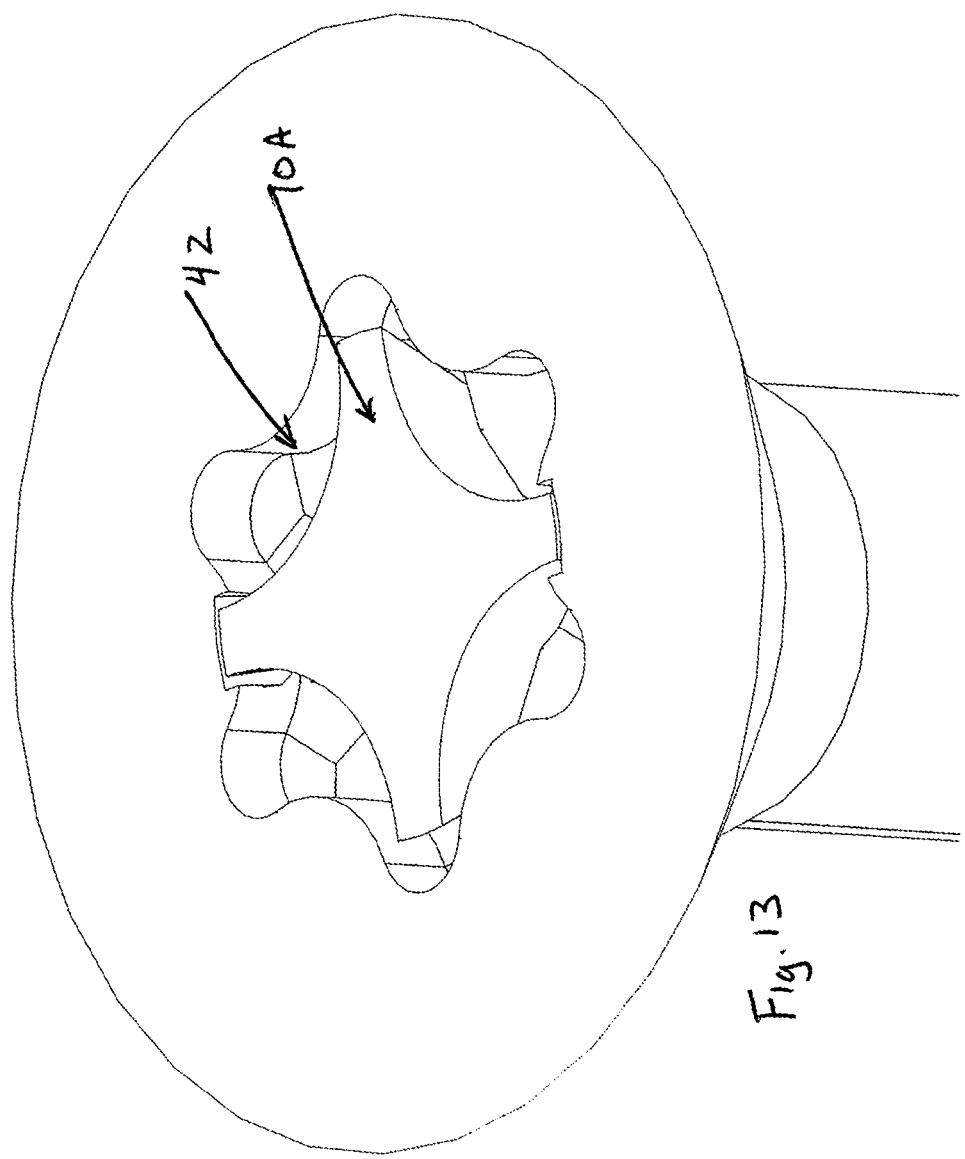
Figure 14:
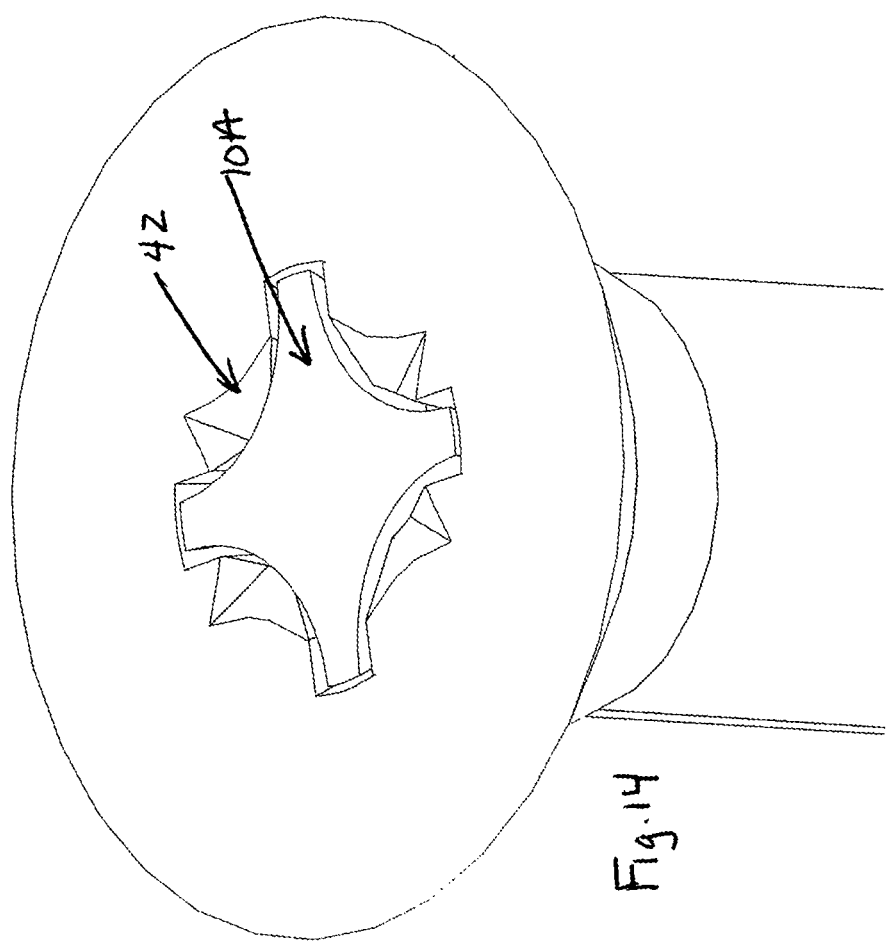
Figure 15:
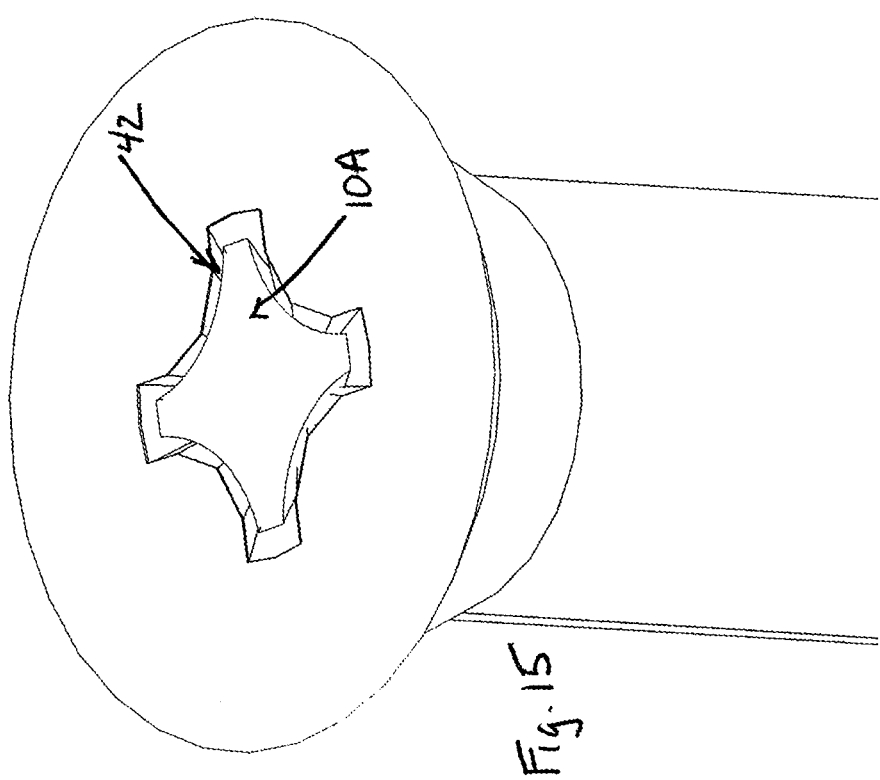
Figure 16:
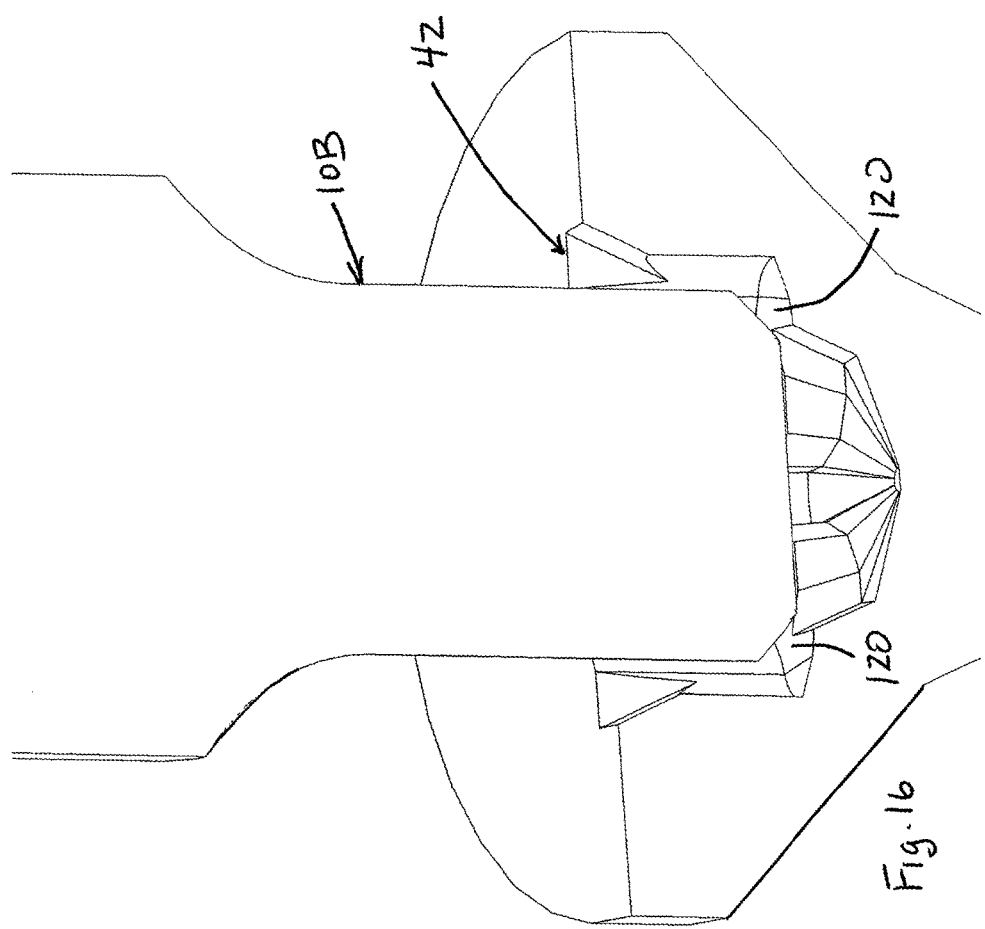
FIGS. 16-21 show various cross-sections of the square drive bit engaged within the drive recess.
Figure 17:
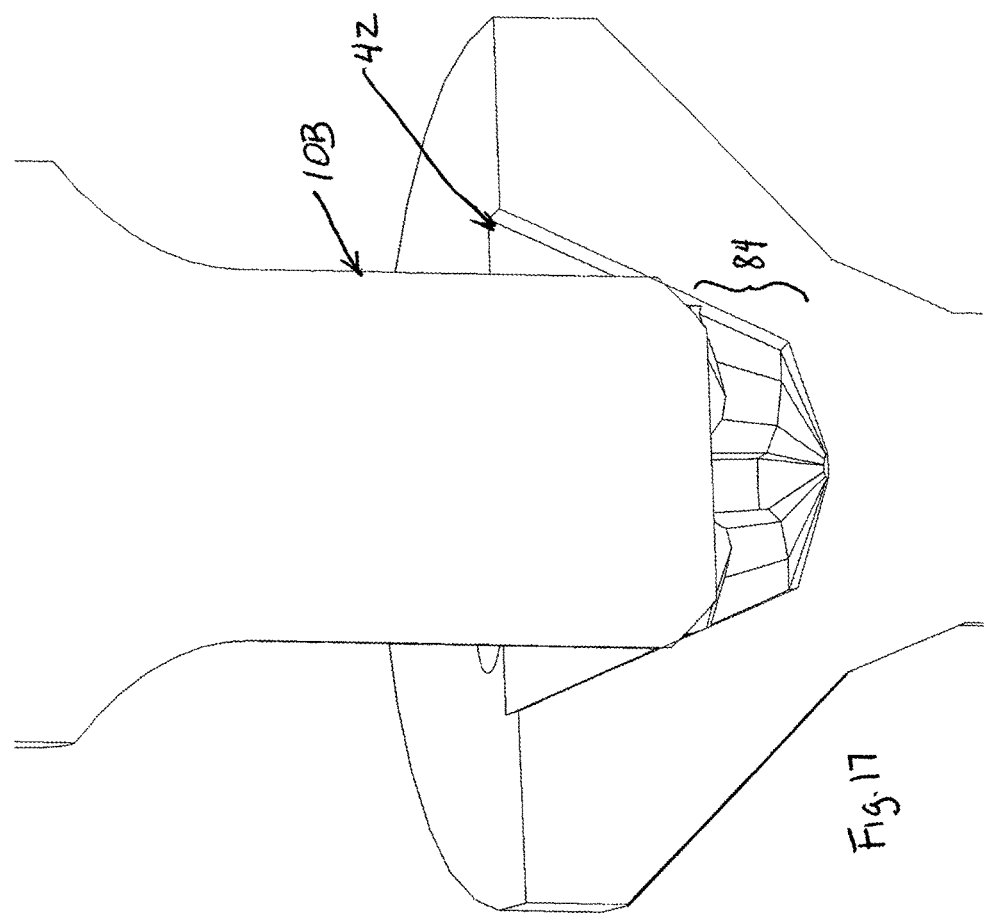
Figure 18:
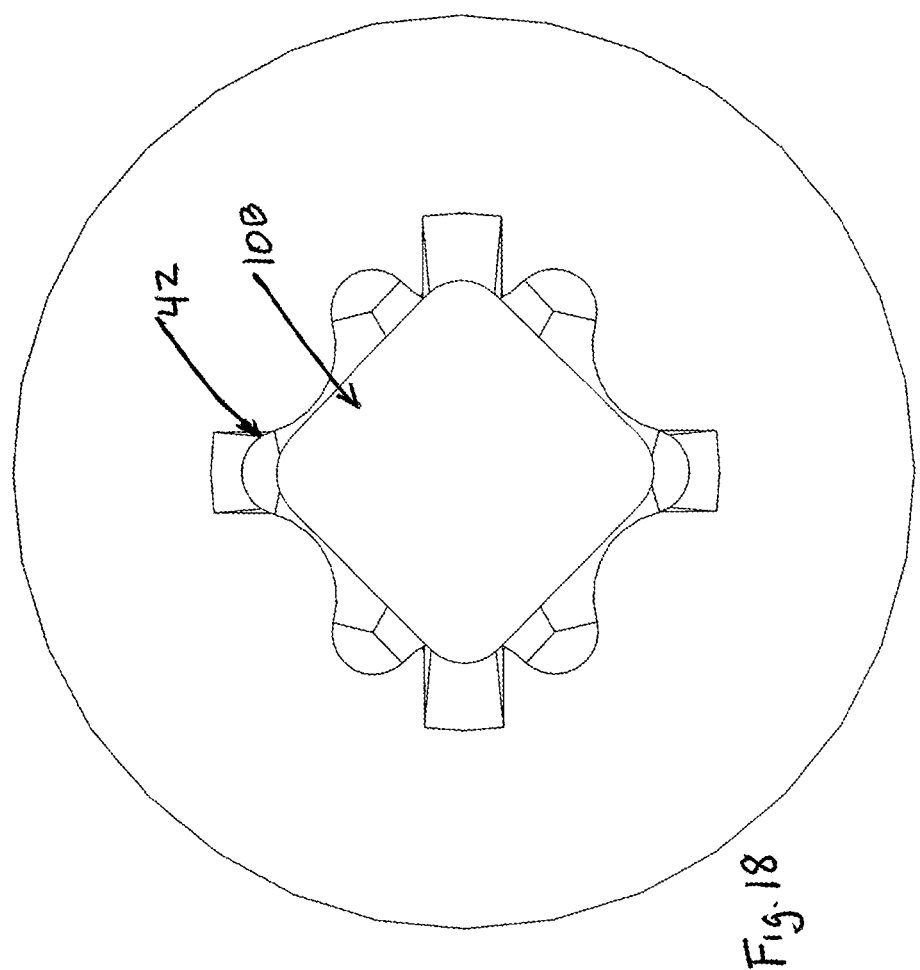
Figure 19:
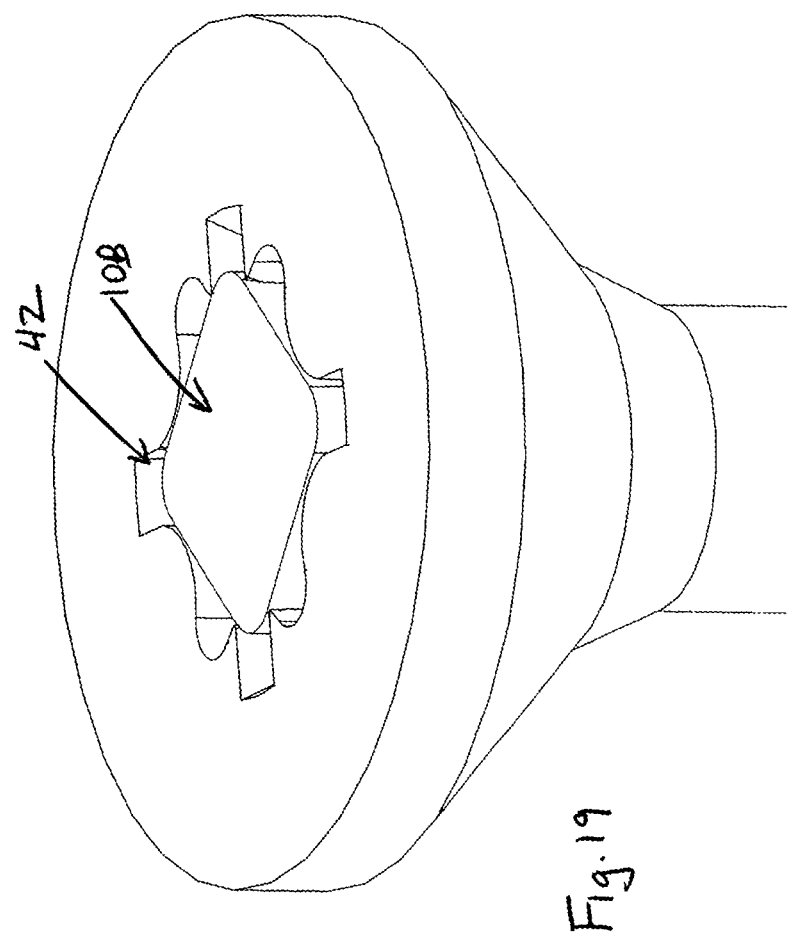
Figure 20:
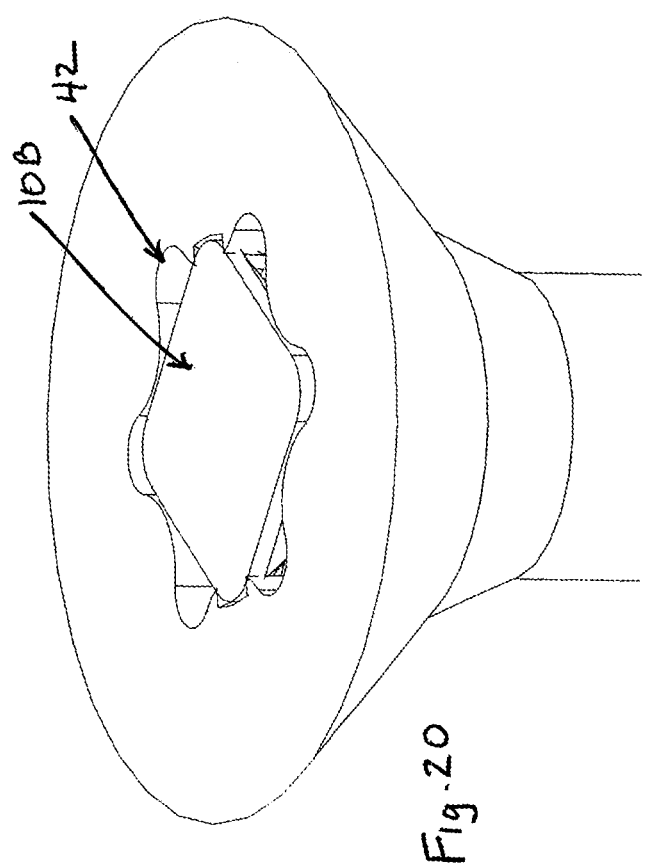
Figure 21:
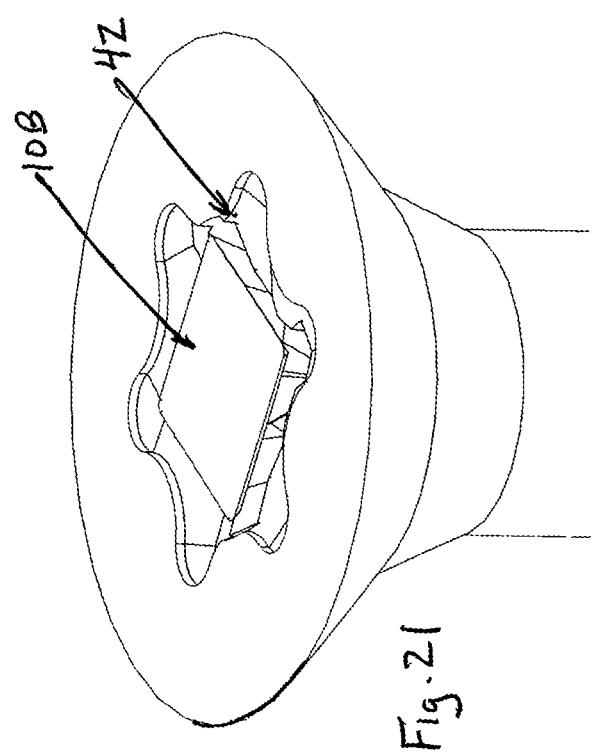
Figure 22:
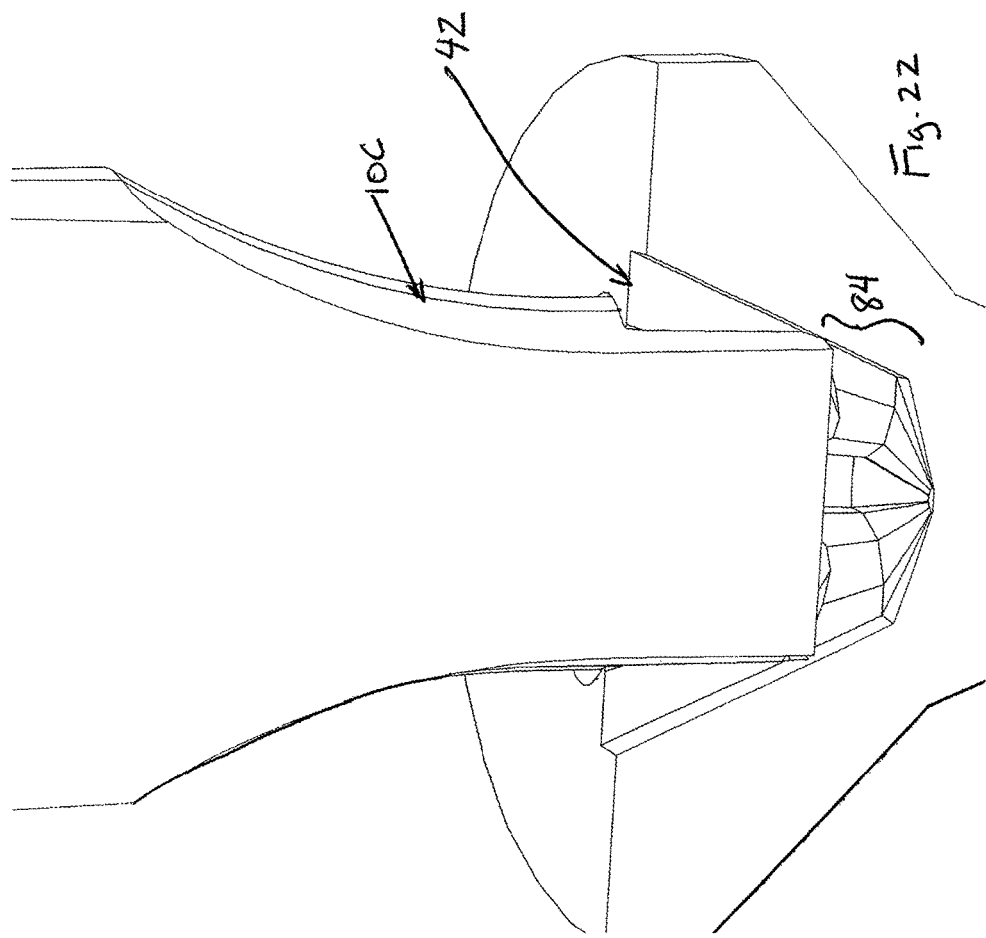
Figure 23:
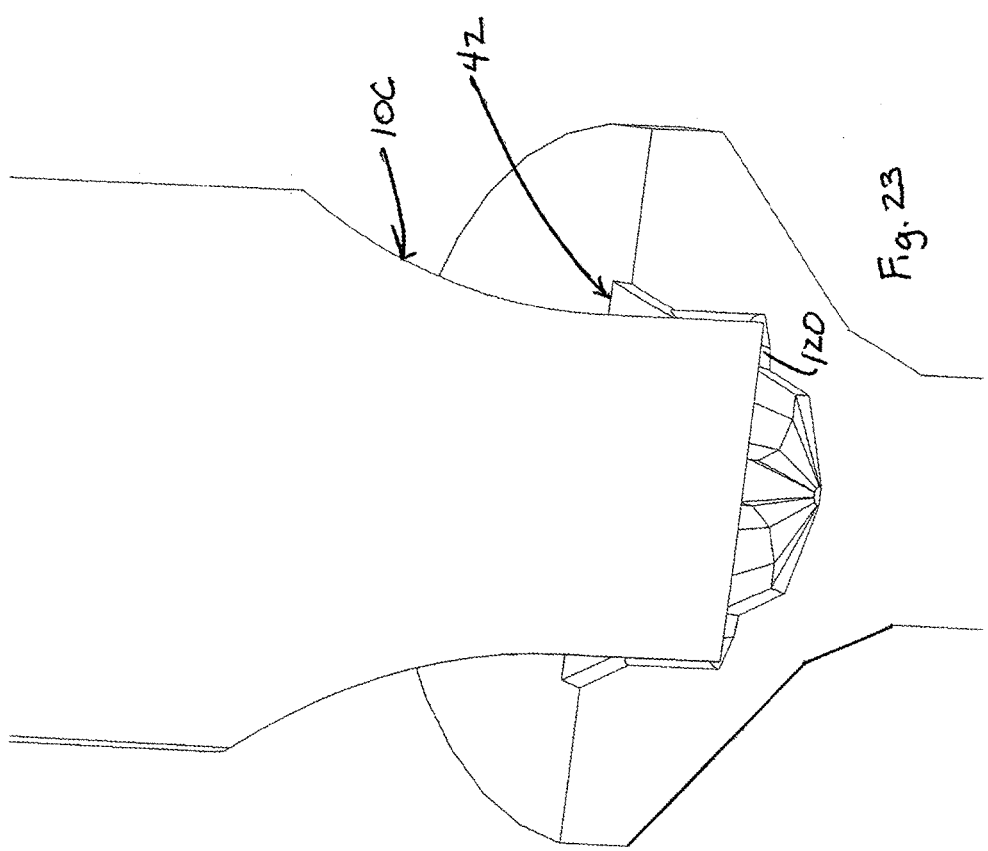
Figure 24:
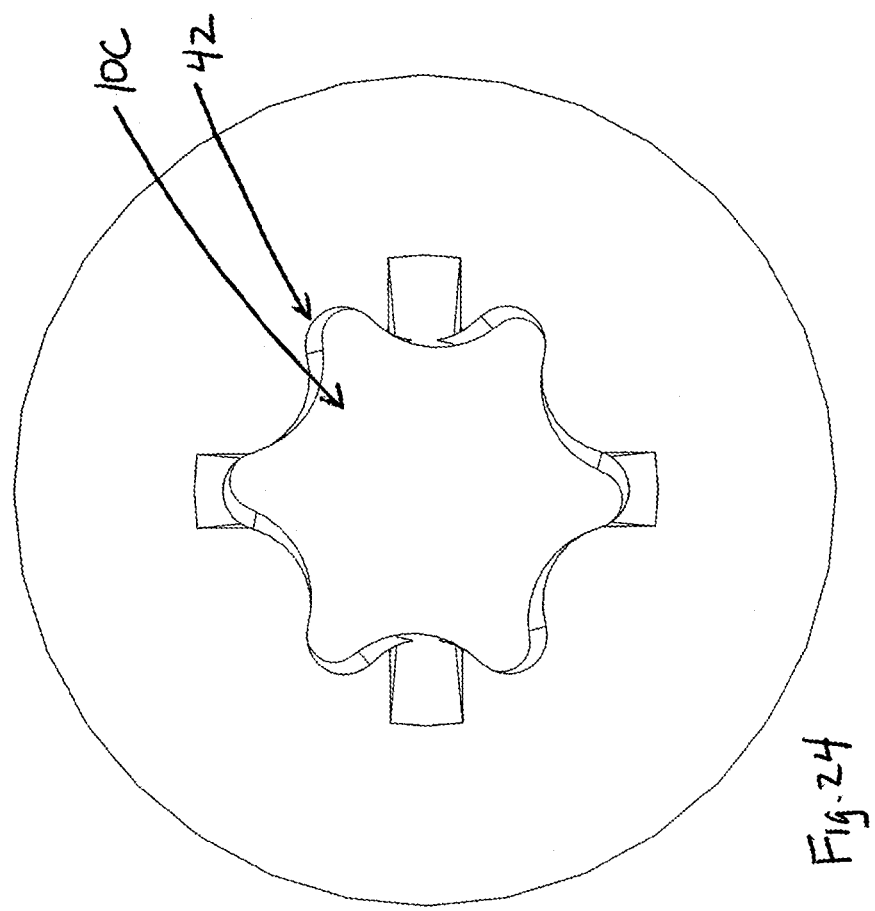

As best seen in FIGS. 6-8, the drive recess 42 includes an upper portion 80 extending from the end face 54 downward to a recess depth 82 at a distance D82 from the end face 54, and a lower portion 84 extending from the recess depth 82 downward to a recess depth 86 at a distance D86 from the end face 54. Here, a ratio the depth D86 over depth D82 is between about 1.4 and about 1.7 to 1, such as between about 1.5 and 1.6 to 1.

A plurality of perimeter wall sections extend from the end face 54 downward into the drive recess. The perimeter wall sections aligned with each of the outwardly extending curved profile segments 66, 66', 68 and 68' (e.g., wall sections 90 and 92 shown in FIG. 6) all run substantially parallel to the central axis 52 of the fastener and substantially to recess depth 82. Each of the outwardly extending rectangular segments 62, 62' includes opposed side wall sections (e.g., 94 and 96 for rectangular segment 62 and 98 and 100 for segment 62') that runs substantially parallel to the central axis 52 from the end face 54 substantially to recess depth 82, and an end wall section (e.g. 104 for segment 62 and 106 for segment 62') that angles toward the central axis 52 when running from the end face 54 substantially to the recess depth 82. Each outwardly extending rectangular segment 64, 64' includes opposed side wall sections (e.g., 110 and 112 for segment 62) that runs substantially parallel to the central axis 54 from the end face 54 to an intermediate recess depth 114 where the opposed side wall sections converge with an outwardly curved wall section (e.g., 116) that runs substantially to recess depth 82, and an end wall section (e.g., 118) that angles toward the central axis 52 when running from the end face to an intermediate depth to also converge with curved wall section 116. Thus, when moving down into the recess, and at an intermediate depth within the upper portion 80, in the rectangular segments 64, 64', the rectangular profile gives way to curved profile segments that, in combination with curved segments 66, 66', 68 and 68' establish six equally spaced lobes (spacing at every sixty circumferential degrees) for matching with the lobes 24 of the star drive.

The lower portion 84 includes multiple wall sections (e.g., 120) extending downward and inwardly toward the central axis 52 at an angle β1 of between 15 and 25 degrees relative to a plane 122 perpendicular to the central axis 52, and multiple wall sections (e.g., 124) extending downward from wall sections 120 and inwardly toward the central axis at an angle β2 of between 60 and 70 degrees relative to the plane 122, and multiple wall sections (e.g., 126) extending downwardly from wall sections 124 and inwardly toward the central axis 52 at an angle β3 of between 15 and 25 degrees relative to the plane 122. Here, angle β2 also represents the angle of the end wall sections (e.g., 118 and 106) extending downward within rectangular segments 62, 62', 64 and 64'. The lower portion 84 also includes planar surface portions 152, 154, 156 etc. that align with planar side wall portions at the upper section of the recess (e.g., 152 may lie in a common plane with 94, 154 in the a common plane with 98 and 156 in a common plane with 110). Surfaces 152, 94, 154 and 98 may all typically lie in a common plane, despite the discontinuity between the surface portions.

Referring to FIGS. 9-15, various cross-sections of the Phillips drive bit 10A engaged within the drive recess 42 are shown. Notably, the tip of the drive bit seats substantially to the bottom of the recess 42, and the drive wings 14 align with respective rectangular segments 62, 62', 64, 64' of the recess end face profile. Interaction between the wings and the rectangular segments during bit rotation effect rotation of the fastener.

Referring to FIGS. 16-21, various cross-sections of the square drive bit 10B engaged within the drive recess 42 are shown. Notably, the tip of the drive bit does not seat to the bottom of the recess 42, but instead stops in the upper part of the recess lower portion 84 as a result of contact with wall sections 120. The corner edge regions of the bit align with respective rectangular segments 62, 62', 64, 64' of the recess end face profile. When the bit is rotated, the bit surface portions of the planar drive walls in or proximate the corner edge regions interact with the sides of the rectangular segments to rotate the fastener.

Referring to FIGS. 22-28, various cross-sections of the square drive bit 10C engaged within the drive recess 42 are shown. Notably, the tip of the drive bit does not seat to the bottom of the recess 42, but instead stops in the upper part of the recess lower portion 84 as a result of contact with wall sections 120. The drive lobes 24 of the bit align with rectangular segments 64, 64' and outward curved segments 66, 66', 68, 68' of the recess end face profile. The drive lobes 24 in the rectangular segments engage down into the deeper curved wall sections 116, and thus all drive lobes 24 engaged with curved wall portions for the purpose of torque transmission.

Referring to FIGS. 29-34, various cross-sections of the slot drive bit 10D engaged within the drive recess 42 are shown. Notably, the tip of the drive bit seats almost to the bottom of the recess 42, but stops as a result of contact with wall sections 126. The side edges of the bit align with rectangular segments 62, 62' as shown, but could also align with segments 64, 64' of the recess end face profile. In either case, for the purpose of torque transmission, the interaction of the surface portions at the edge of the bit with surfaces of the recess is therefore primarily with planar surface portions of the recess as opposed to curved surface portions.

It is to be clearly understood that the above description is intended by way of illustration and example only, is not intended to be taken by way of limitation, and that other changes and modifications are possible. For example, while certain relative dimensions have been provided by example above, variations are possible.

What is claimed is:

1. A threaded fastener, comprising:
   a circular head end, a shank and an entry end, the circular head end located at one end of the shank and the entry end located at an opposite end of the shank,
   wherein the circular head end includes an end face with a drive recess configured for being driven by multiple drive bit shapes, including a star or six lobe drive, a Phillips drive, a square drive and a flat blade drive;
   wherein the drive recess is aligned on a central axis of the threaded fastener, and the drive recess includes: an end profile in the end face about the central axis, the end profile including
      first and second diametrically opposed and outwardly extending rectangular segments,
      third and fourth diametrically opposed and outwardly extending rectangular segments,
      first and second diametrically opposed and outwardly extending curved segments,
      third and fourth diametrically opposed and outwardly extending curved segments,
      first and second diametrically opposed and inwardly extending curved segments and
      third and fourth diametrically opposed and inwardly extending curved segments;
   wherein the drive recess includes an upper portion extending from the end face to a first recess depth at a first distance from the end face, and a lower portion extending from the first recess depth to a second recess depth at a second distance from the end face, where the second recess depth defines a terminal distal end of the drive recess;
   wherein each of the first and second outwardly extending rectangular segments includes a first end wall section that angles toward the central axis at a first angle when running continuous from the end face into the lower portion and transitioning to a second end wall section that angles towards the central axis at a second angle when running from the lower portion to the terminal distal end of the drive recess, wherein the second angle is greater than the first angle; and
   wherein each of the third and fourth outwardly extending rectangular segments includes a first end wall section that angles toward the central axis at the first angle when running from the end face to an intermediate depth at which the first end wall section converges with an outwardly curved wall section that runs parallel to the central axis, wherein the first end wall section is spaced from but aligned with a second end wall section in the lower portion that also angles towards the central axis at the first angle, and the second end wall section transitions to a third end wall section that angles towards the central axis at the second angle when running from the lower portion to the terminal distal end of the drive recess.

2. The threaded fastener of claim 1 wherein the first outwardly extending curved segment is located adjacent a first side of the first outwardly extending rectangular segment, the third outwardly extending curved segment is located adjacent a second side of the first outwardly extending rectangular segment.

3. The threaded fastener of claim 2 wherein the second outwardly extending curved segment is located adjacent a first side of the second outwardly extending rectangular segment, the fourth outwardly extending curved segment is located adjacent a second side of the second outwardly extending rectangular segment.

4. The threaded fastener of claim 3 wherein the first inwardly extending curved segment is located adjacent a first side of the third outwardly extending rectangular segment, the third inwardly extending curved segment is located adjacent a second side of the third outwardly extending rectangular segment.

5. The threaded fastener of claim 4 wherein the second inwardly extending curved segment is located adjacent a second side of the fourth outwardly extending rectangular segment, the fourth inwardly extending curved segment is located adjacent a second side of the fourth outwardly extending rectangular segment.

6. The threaded fastener of claim 1 wherein a radial distance from the central axis to an outermost part of each outwardly extending rectangular segment is greater than a radial distance from the central axis to an outermost part of each outwardly extending curved segment, and wherein the radial distance from the central axis to the outermost part of each outwardly extending rectangular segment is less than a radial distance from the central axis to an outside edge of the end face.

7. The threaded fastener of claim 6 wherein a circumferential spacing between a central part of the first outwardly extending rectangular segment and a central part of the first outwardly extending curved segment is between 28 and 32 degrees, a circumferential spacing between the central part of the first outwardly extending rectangular segment and a central part of the third outwardly extending curved segment is between 28 and 32 degrees, a circumferential spacing between a central part of the second outwardly extending rectangular segment and a central part of the second outwardly extending curved segment is between 28 and 32 degrees, a circumferential spacing between the central part of the second outwardly extending rectangular segment and a central part of the fourth outwardly extending curved segment is between 28 and 32 degrees.

8. The threaded fastener of claim 7 wherein a circumferential spacing between the central part of the first outwardly extending curved segment and a central part of the third outwardly extending rectangular segment is between 58 and 62 degrees, a circumferential spacing between the central part of the second outwardly extending curved segment and a central part of the fourth outwardly extending rectangular segment is between 58 and 62 degrees, a circumferential spacing between the central part of the third outwardly extending curved segment and the central part of the fourth outwardly extending rectangular segment is between 58 and 62 degrees, a circumferential spacing between the central part of the fourth outwardly extending curved segment and the central part of the third outwardly extending rectangular segment is between 58 and 62 degrees.

9. The threaded fastener of claim 1 wherein a ratio of the second recess depth to the first recess depth is between about 1.4 and about 1.7.

10. The threaded fastener of claim 1 wherein a plurality of perimeter wall sections extend from the end face into the drive recess, wherein the perimeter wall sections aligned with each of the first, second, third and fourth outwardly extending curved segments all run substantially parallel to the central axis and substantially to the first recess depth.

11. The threaded fastener of claim 1 wherein each of the first and second outwardly extending rectangular segments includes a first side wall section that runs substantially parallel to the central axis from the end face substantially to the first recess depth, and a second side wall section that runs substantially parallel to the central axis from the end face substantially to the first recess depth.

12. The threaded fastener of claim 1 wherein each of the third and fourth outwardly extending rectangular segments includes a first side wall section that runs substantially parallel to the central axis from the end face substantially to an intermediate recess depth and converges with an outwardly curved wall section the runs substantially to the first recess depth, and a second side wall section that runs substantially parallel to the central axis from the end face substantially to the intermediate recess depth and converges with the outwardly curved wall section.

13. The threaded fastener of claim 1 wherein the lower portion includes a first set of wall sections extending downward and inwardly toward the central axis at an angle of between 15 and 25 degrees relative to a plane perpendicular to the central axis, and a second set of wall sections extending downward from the first set of wall sections and inwardly toward the central axis at an angle of between 60 and 70 degrees relative to the plane, and a third set of wall sections extending downwardly from the second set of wall sections and inwardly toward the central axis at an angle of between 15 and 25 degrees relative to the plane.

\* \* \* \* \*